United States Patent [19]
Abramson et al.

[11] Patent Number: 5,881,262
[45] Date of Patent: *Mar. 9, 1999

[54] METHOD AND APPARATUS FOR BLOCKING EXECUTION OF AND STORING LOAD OPERATIONS DURING THEIR EXECUTION

[75] Inventors: Jeffery M. Abramson, Aloha; Haitham Akkary, Portland; Andrew F. Glew, Hillsboro; Glenn J. Hinton; Kris G. Konigsfeld, both of Portland; Paul D. Madland, Beaverton, all of Oreg.

[73] Assignee: Intel Corporation, Santa Clara, Calif.

[ * ] Notice: The term of this patent shall not extend beyond the expiration date of Pat. No. 5,724,536.

[21] Appl. No.: 928,924

[22] Filed: Sep. 12, 1997

Related U.S. Application Data

[63] Continuation of Ser. No. 177,164, Jan. 4, 1994, Pat. No. 5,724,536.

[51] Int. Cl.[6] ..................................................... G06F 13/00
[52] U.S. Cl. ............................................................. 395/392
[58] Field of Search ............................................... 395/392

[56] References Cited

U.S. PATENT DOCUMENTS

| 5,586,278 | 12/1996 | Papworth et al. | 395/393 |
| 5,613,083 | 3/1997 | Glew et al. | 711/207 |
| 5,613,136 | 3/1997 | Casavant et al. | 395/800.28 |
| 5,694,574 | 12/1997 | Abramson et al. | 711/140 |

*Primary Examiner*—James P. Trammell
*Assistant Examiner*—John Q. Chavis
*Attorney, Agent, or Firm*—Blakely, Sokoloff, Taylor & Zafman LLP

[57] ABSTRACT

A method and apparatus for performing load operations in a computer system. The present invention includes a method and apparatus for dispatching the load operation to be executed. The present invention halts the execution of the load operation when a dependency exists between the load operation and another memory operation currently pending in the system. When the dependency no longer exists, the present invention redispatches the load operation so that it completes.

45 Claims, 22 Drawing Sheets

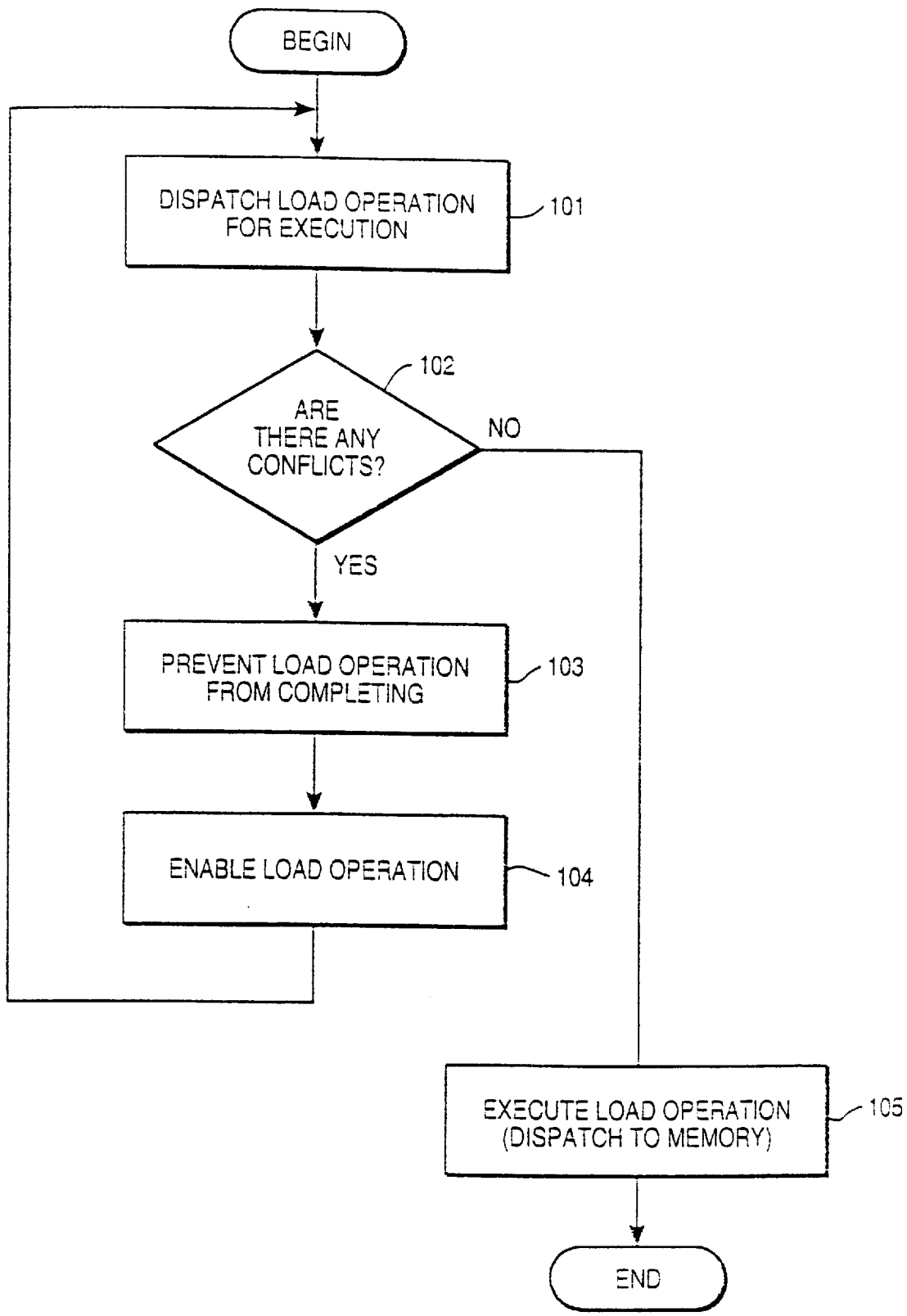
FIG_1

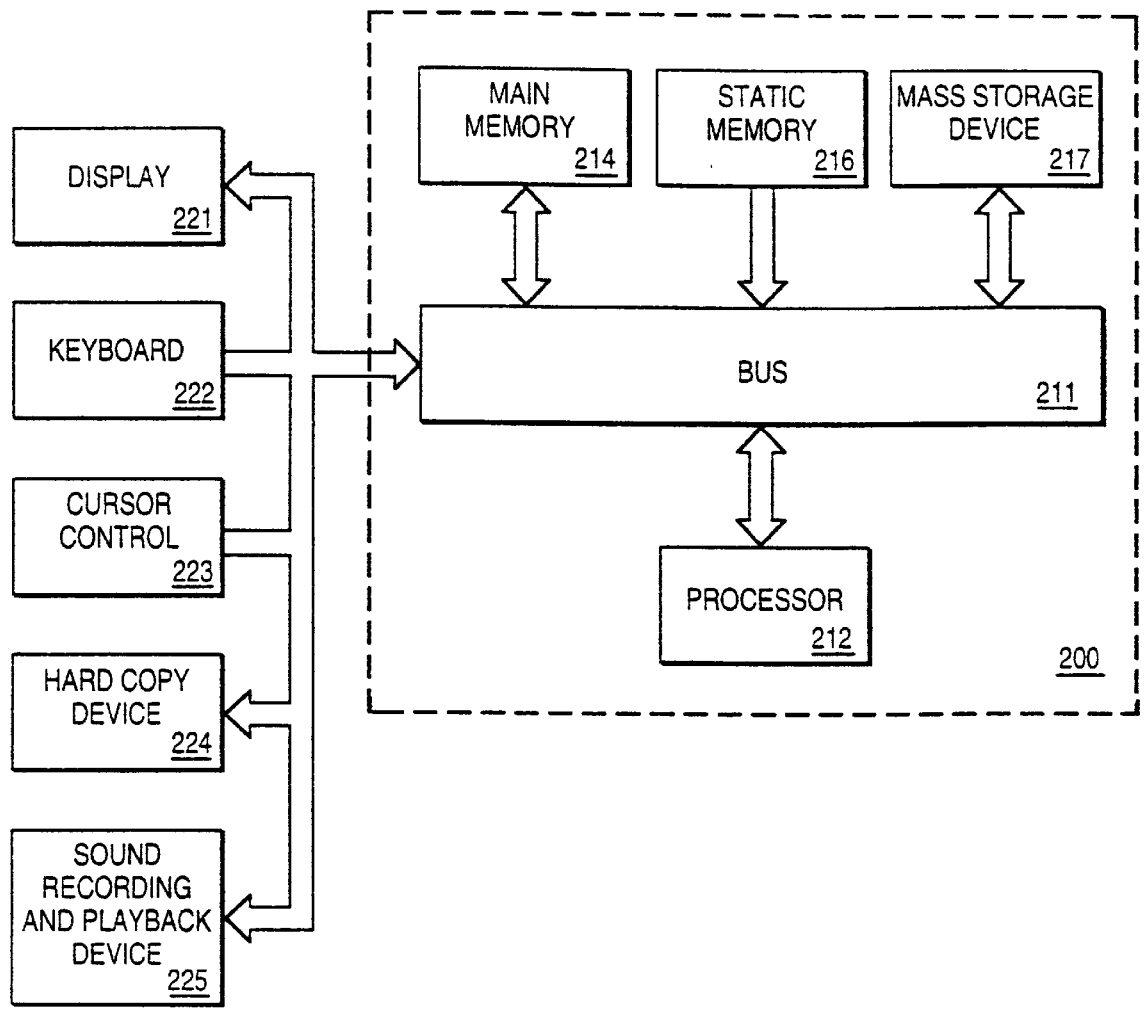
FIG_2A

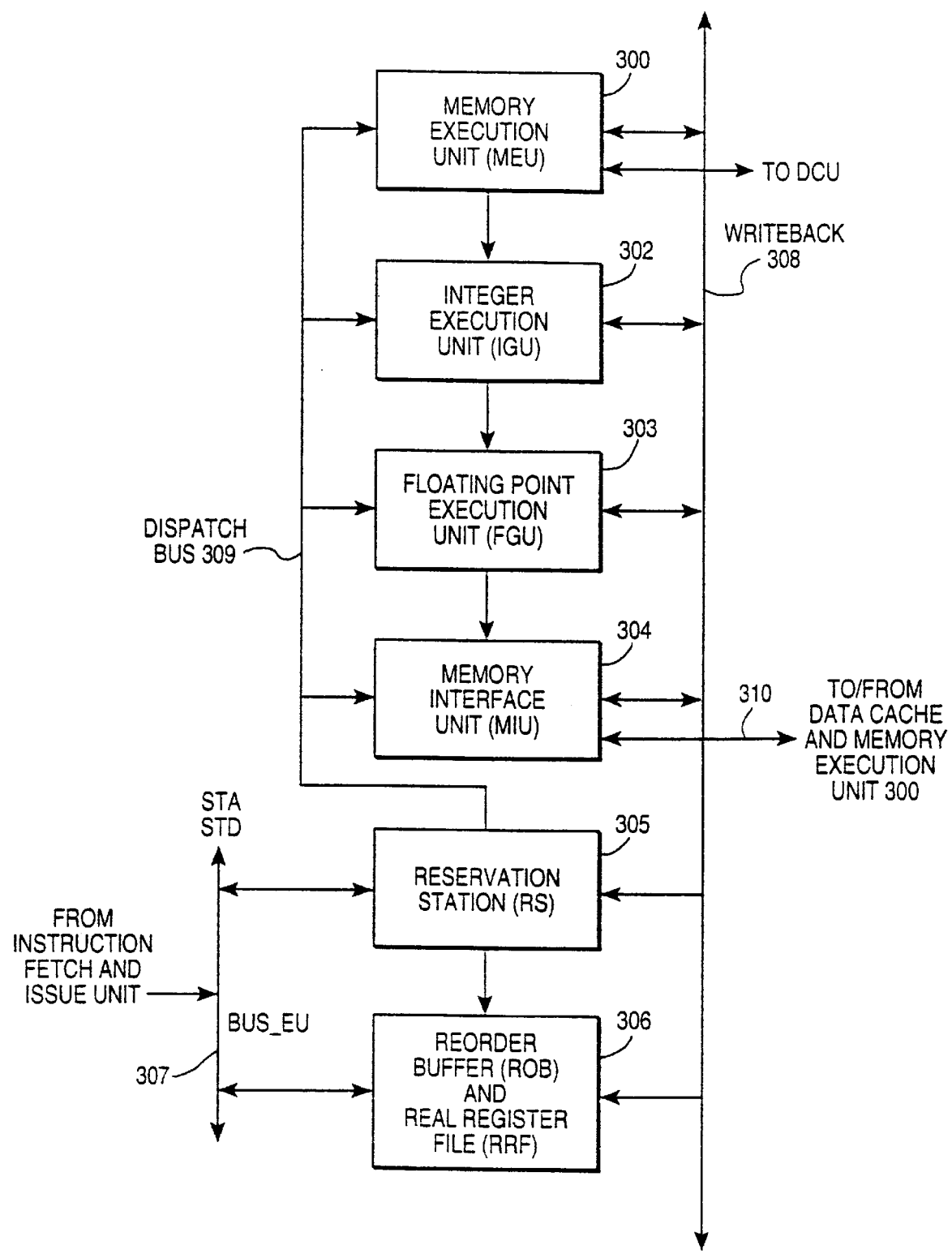
FIG_3

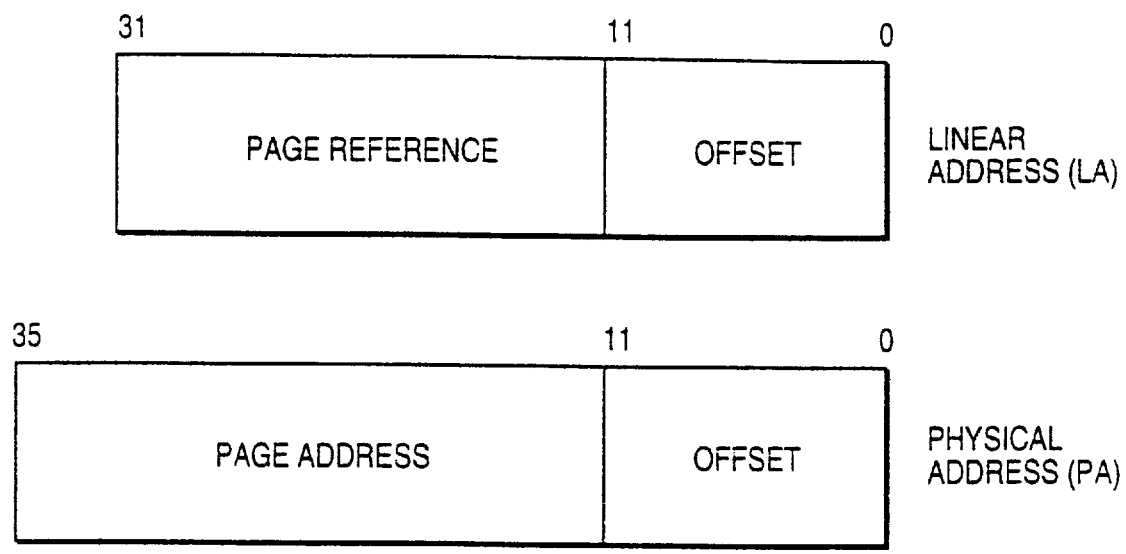
FIG_4

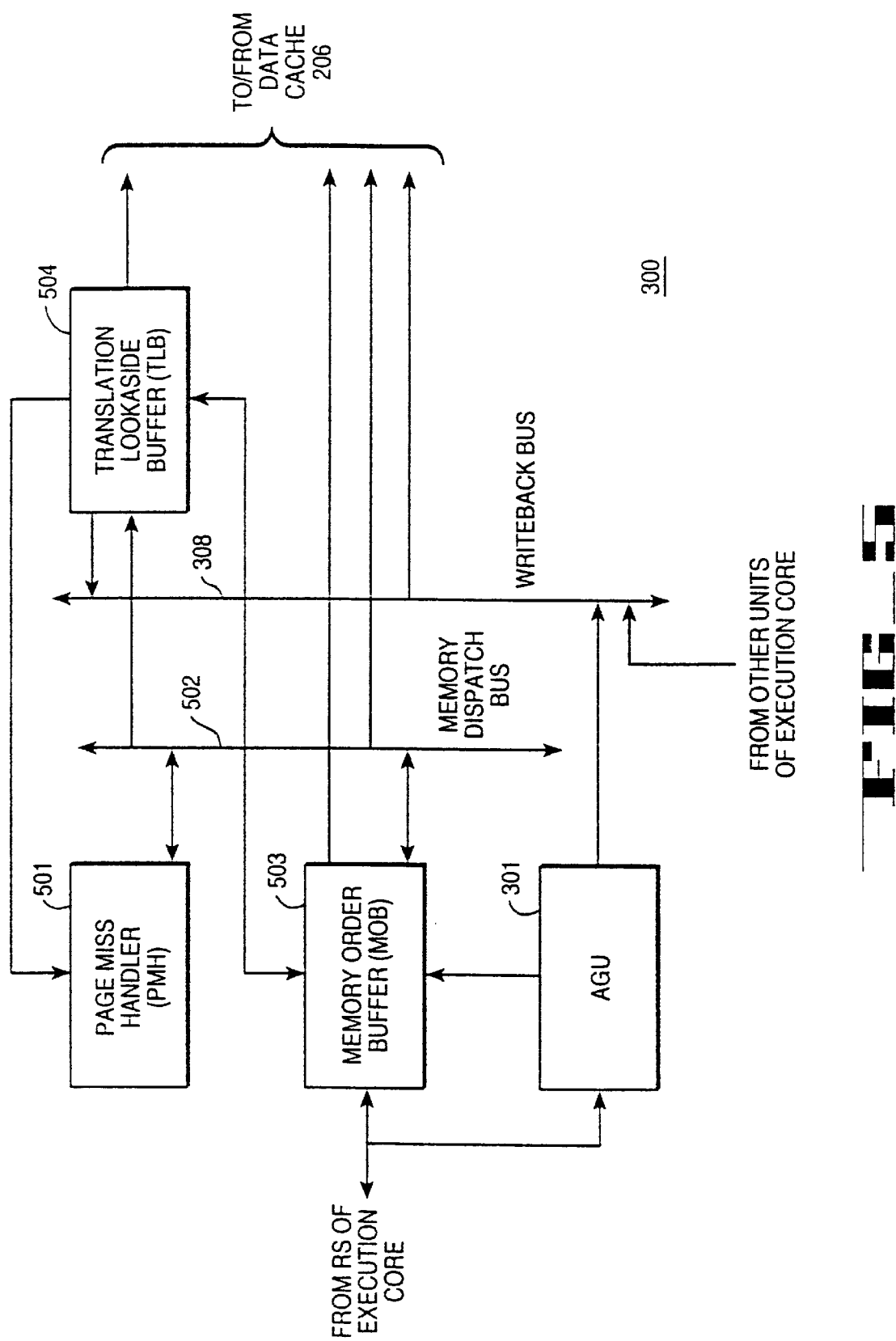

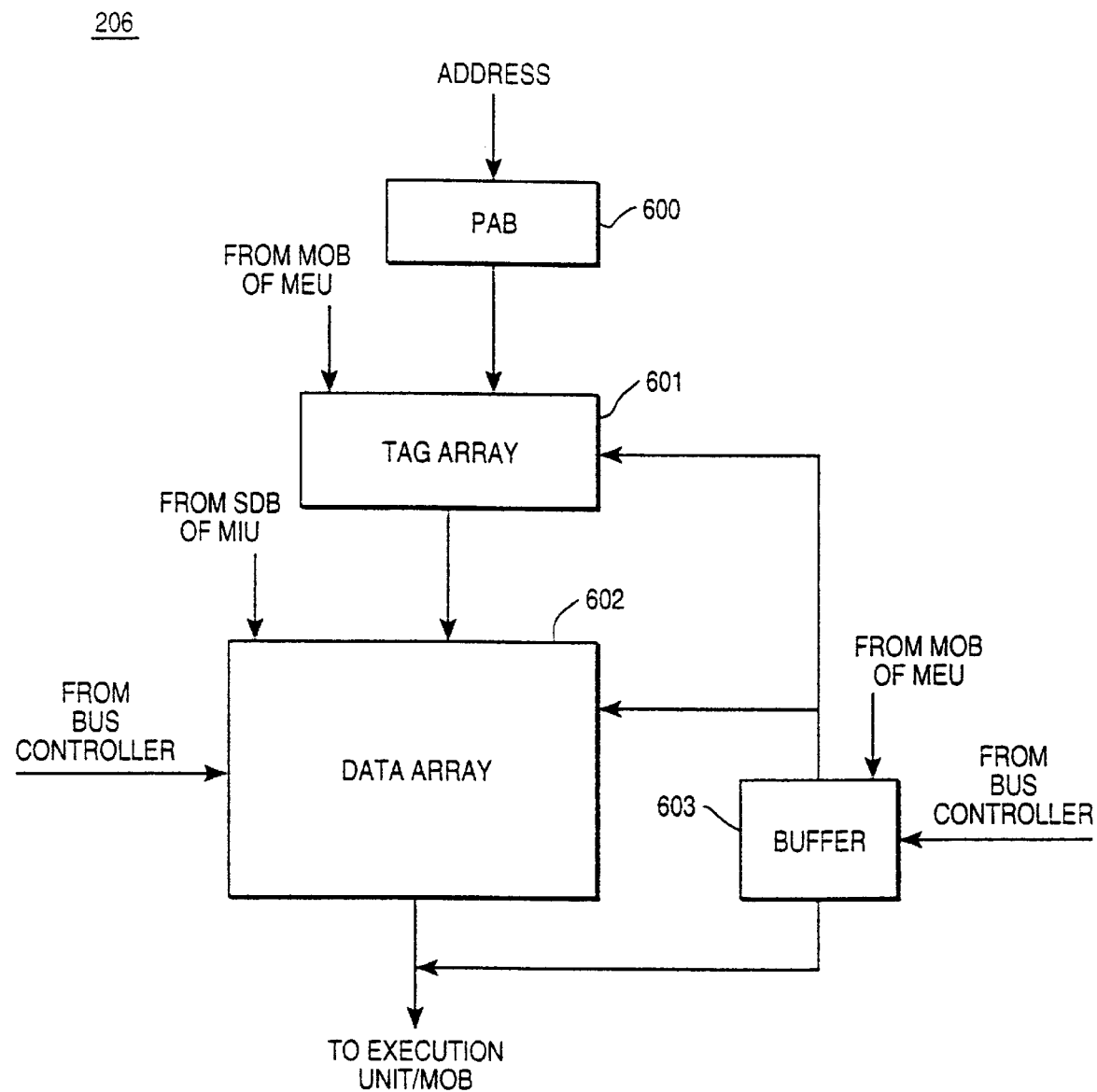
FIG_6

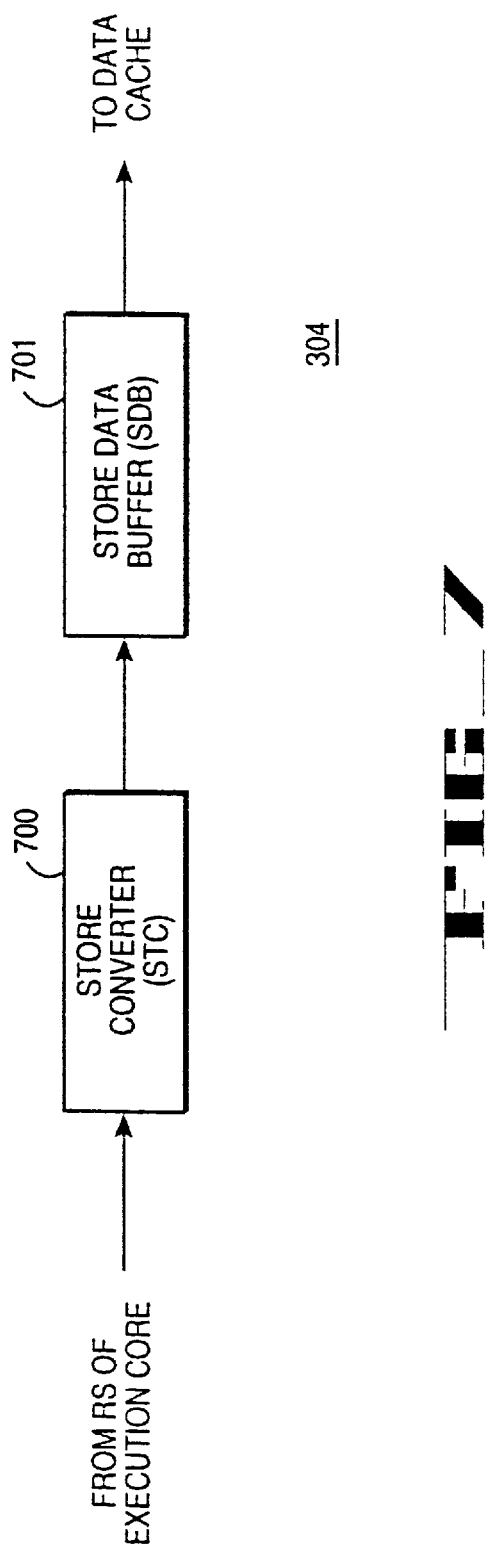

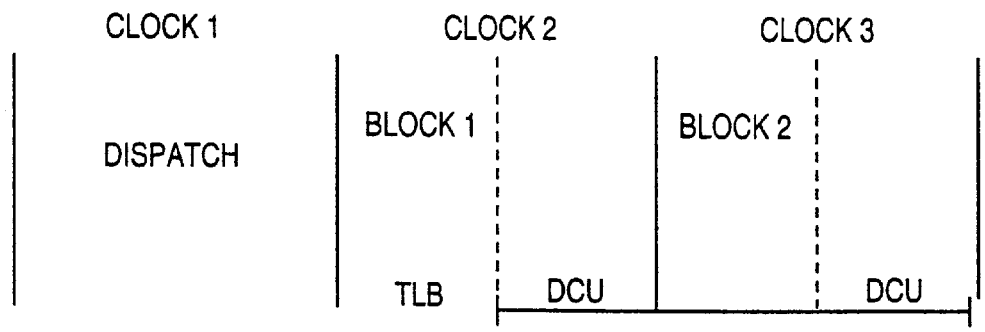
FIG_10
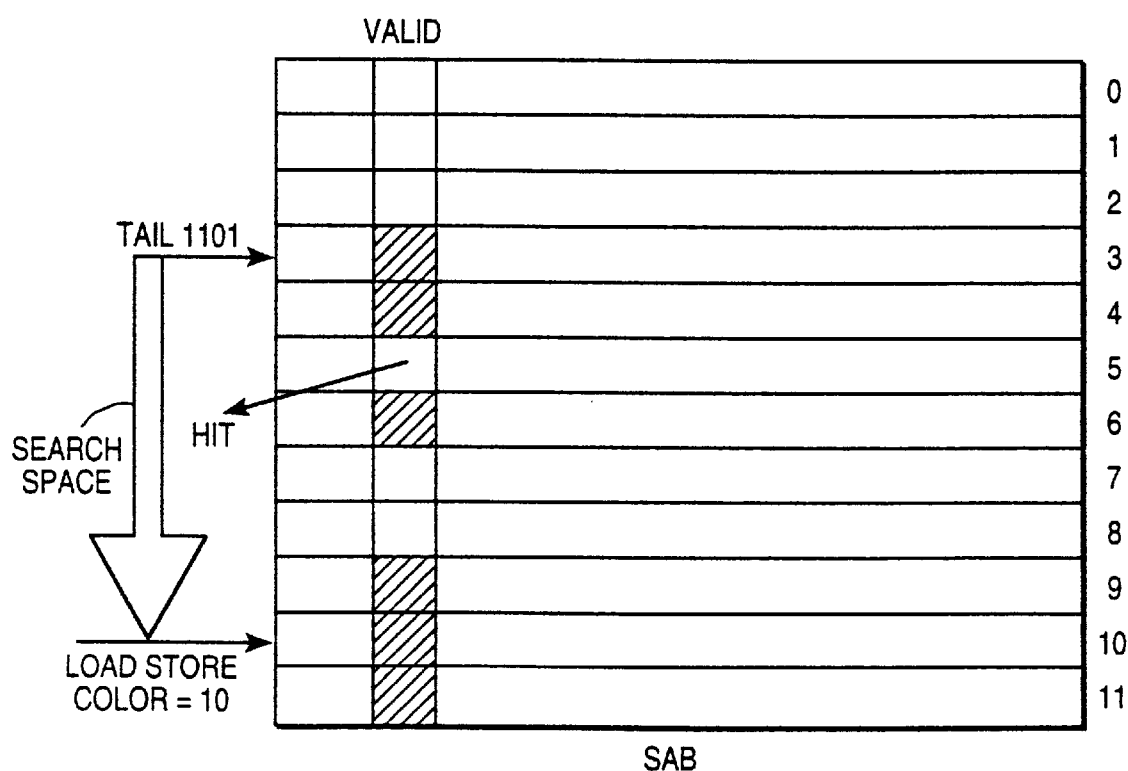
FIG_11

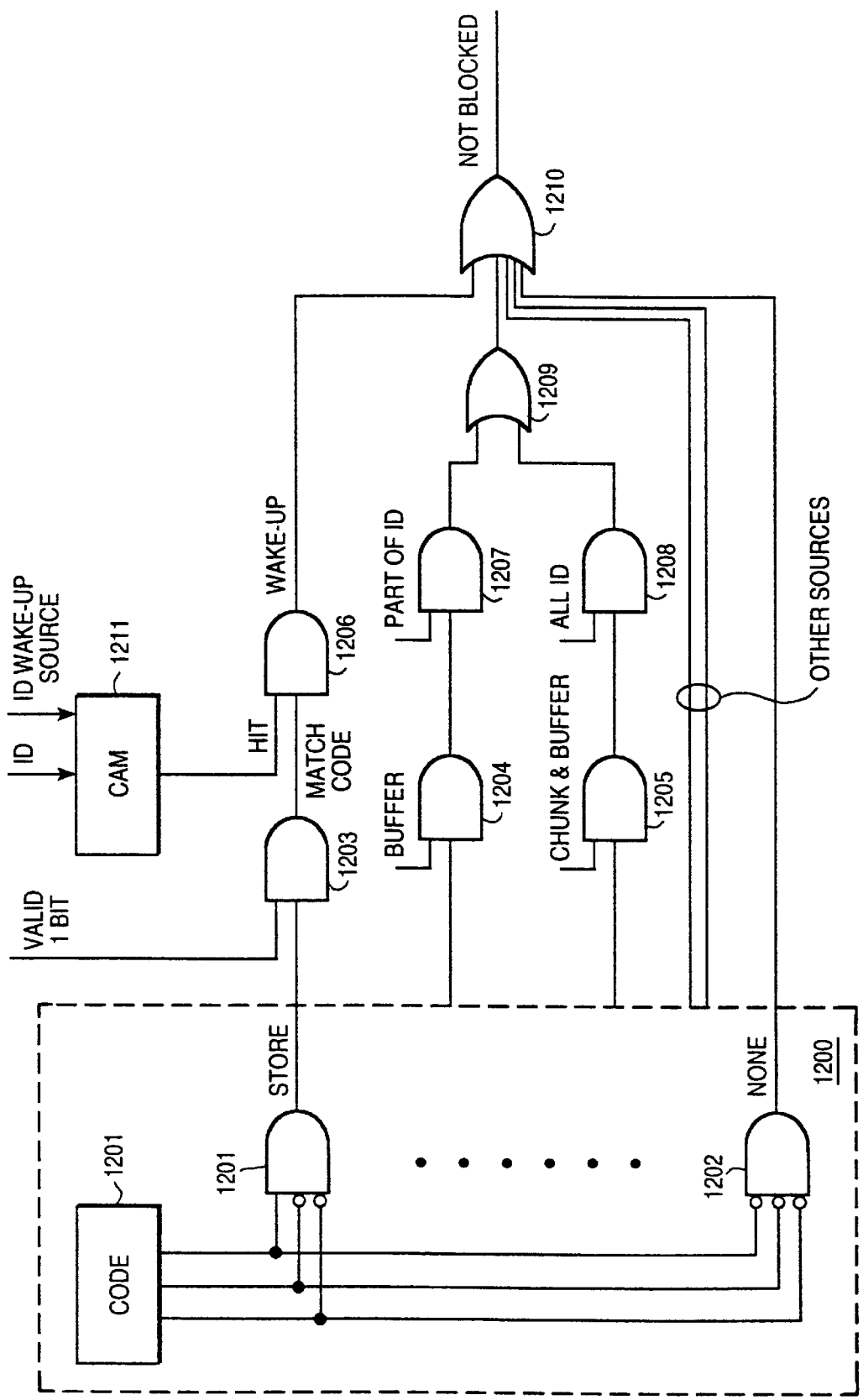
FIG_12

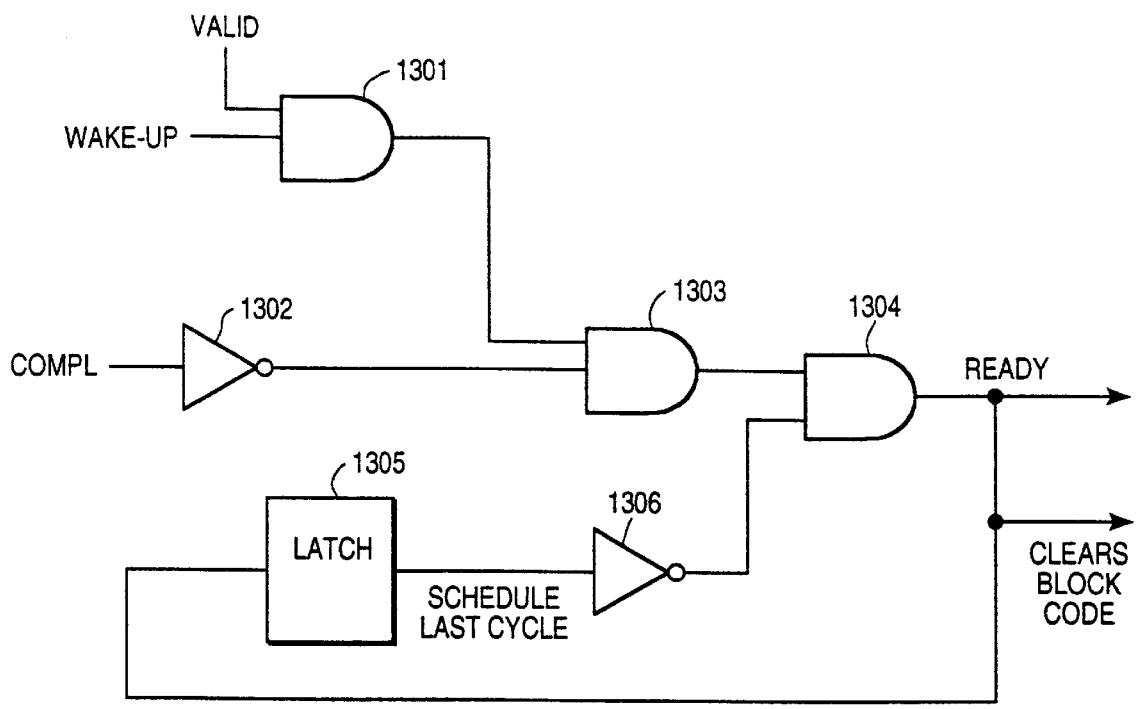
FIG_13
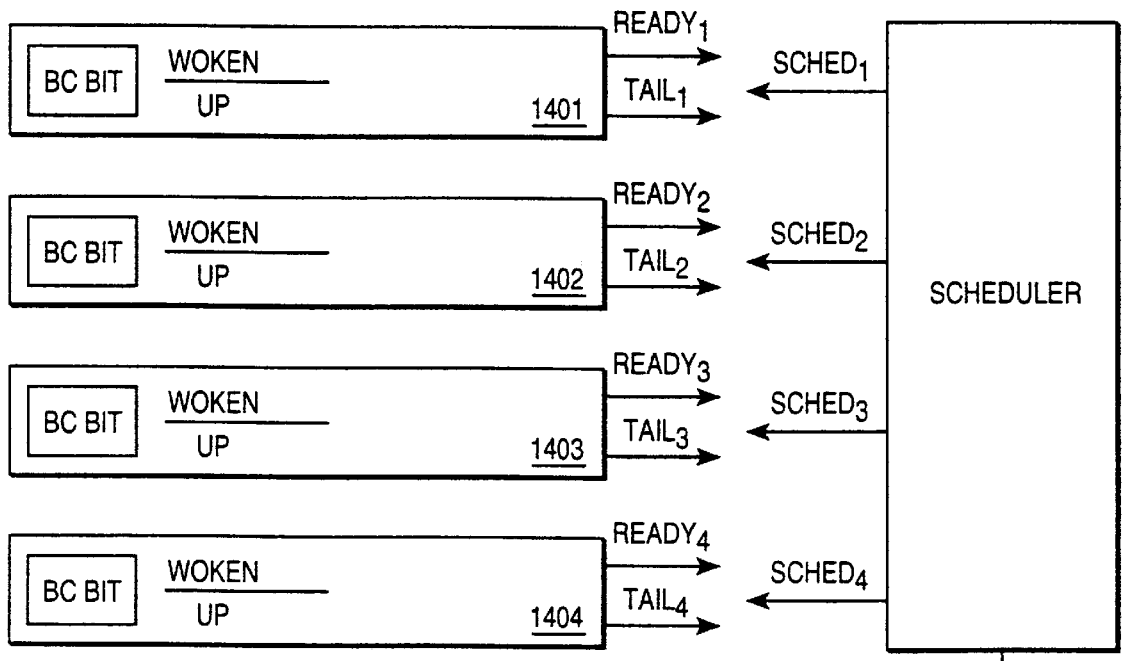
FIG_14

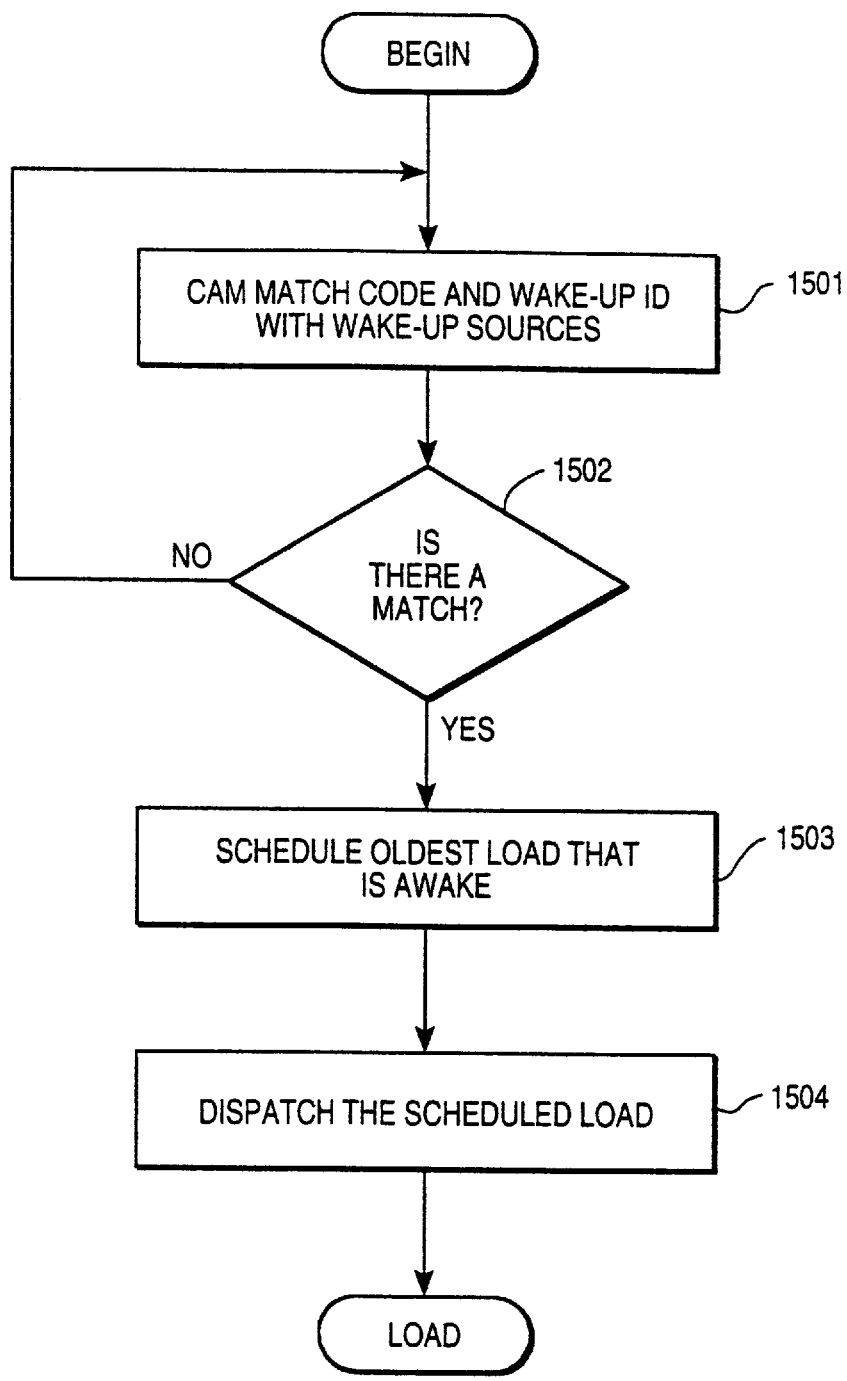
FIG_15

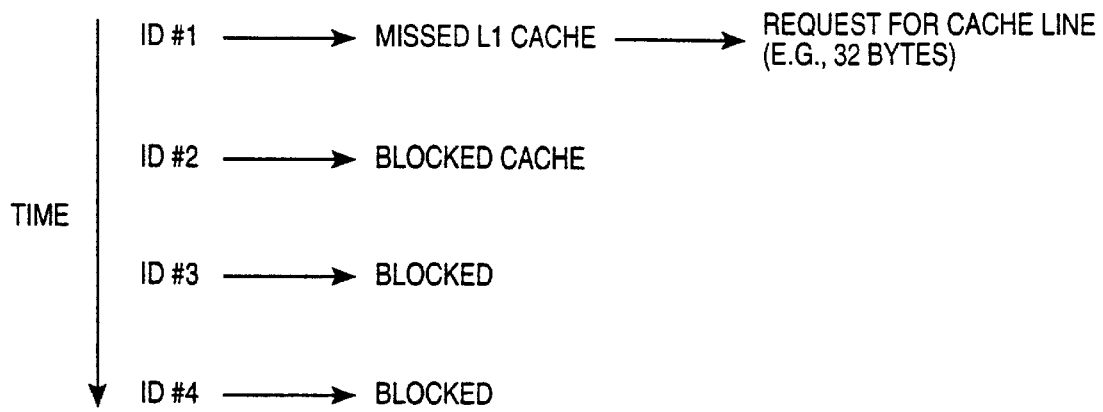
FIG_16

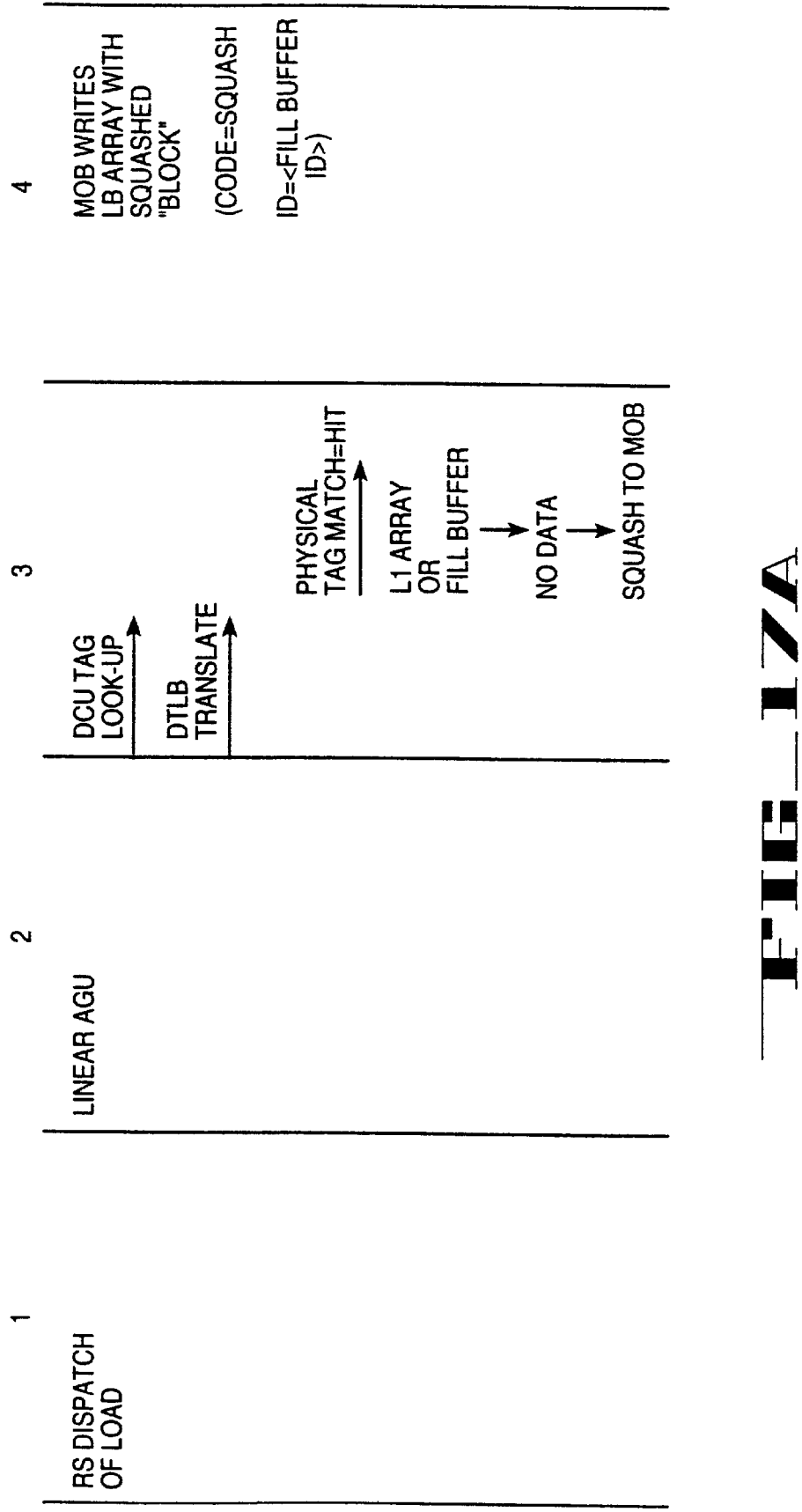
FIG_17A

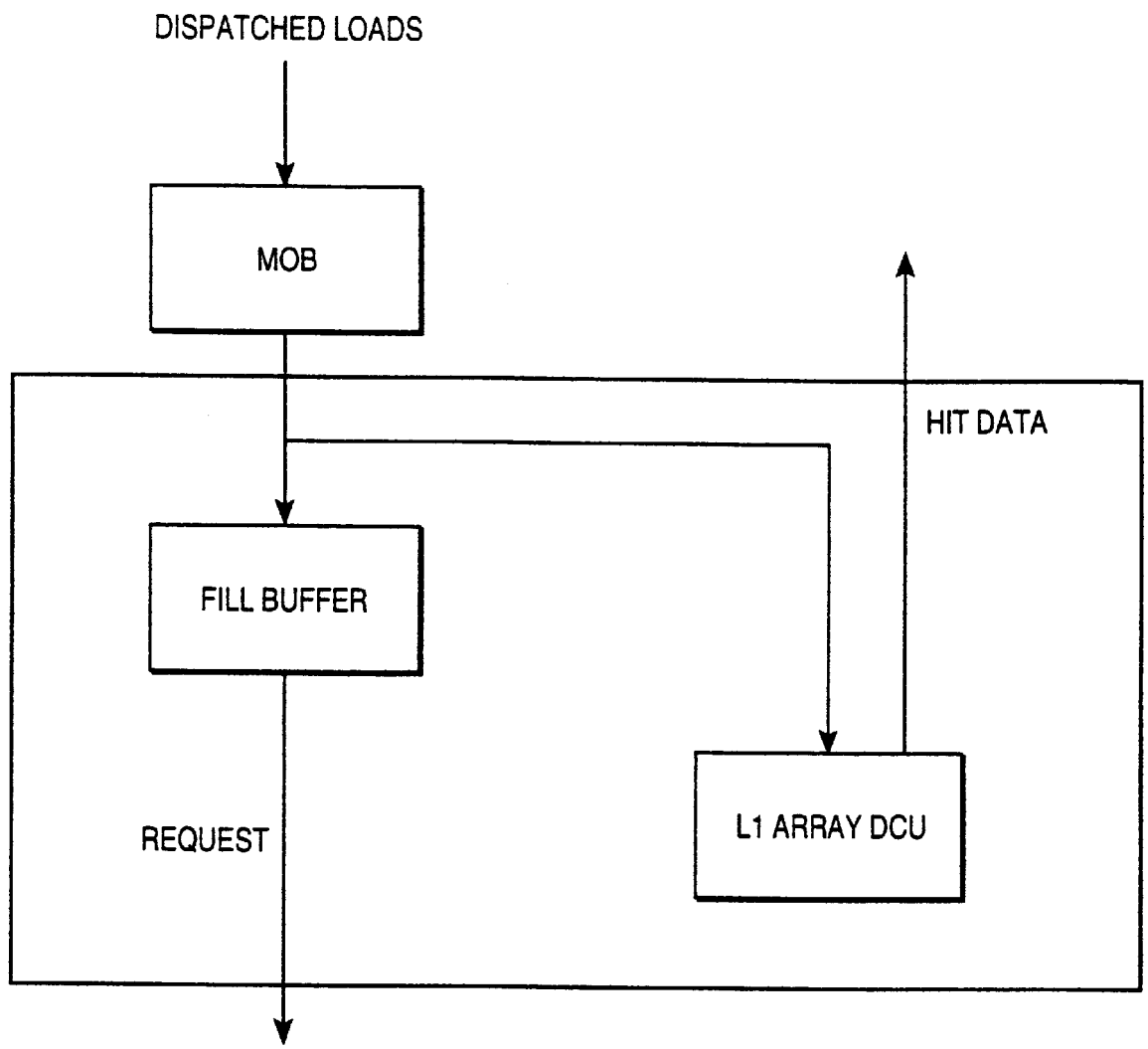
FIG_17B

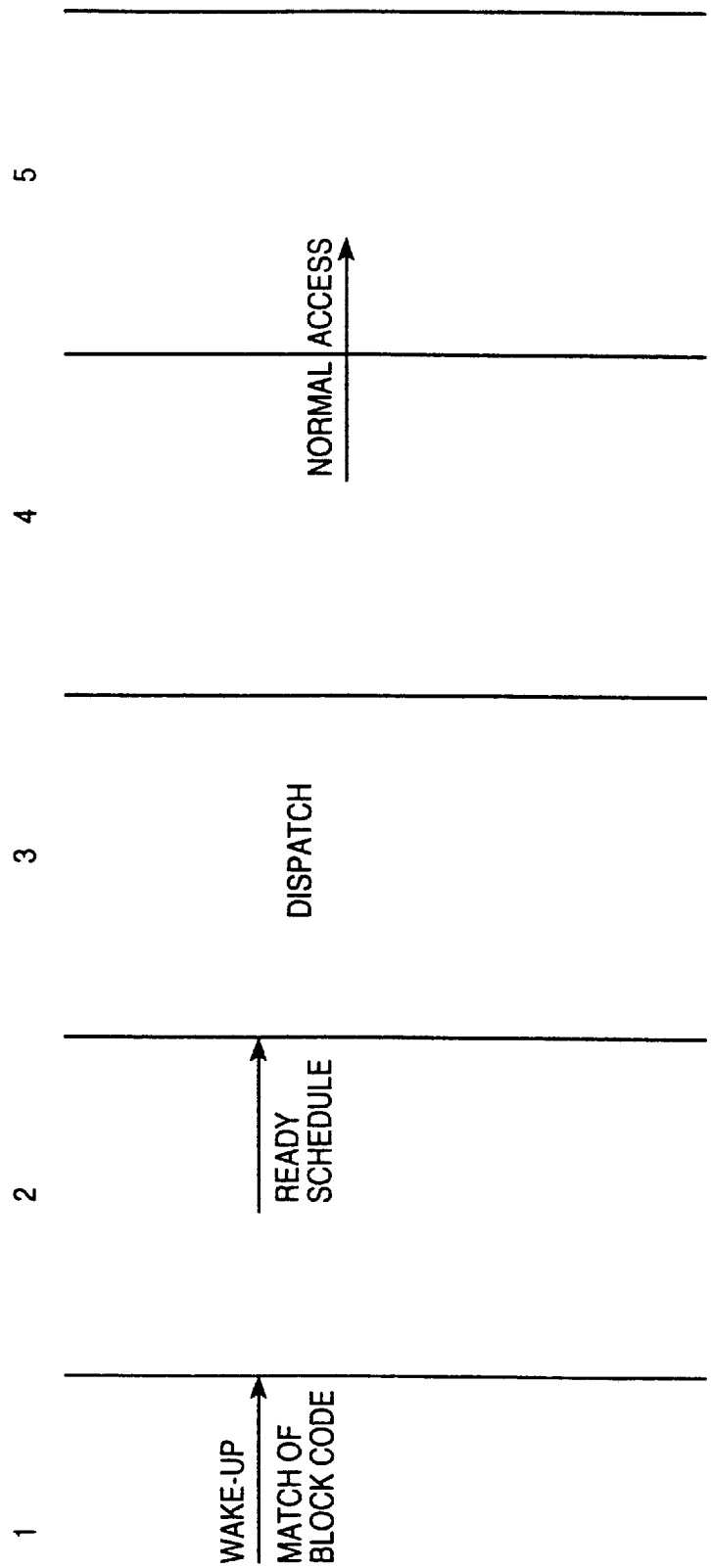

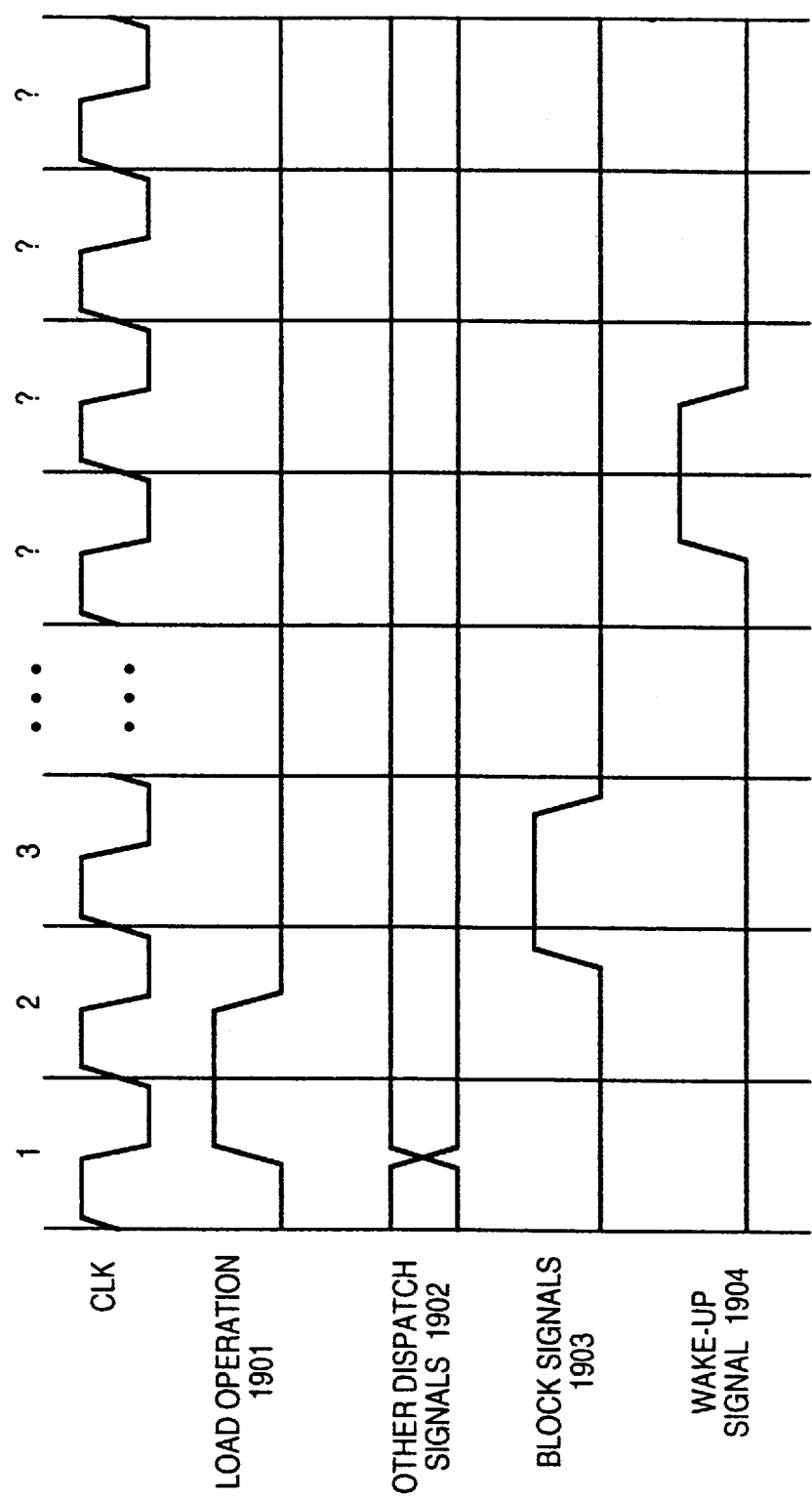

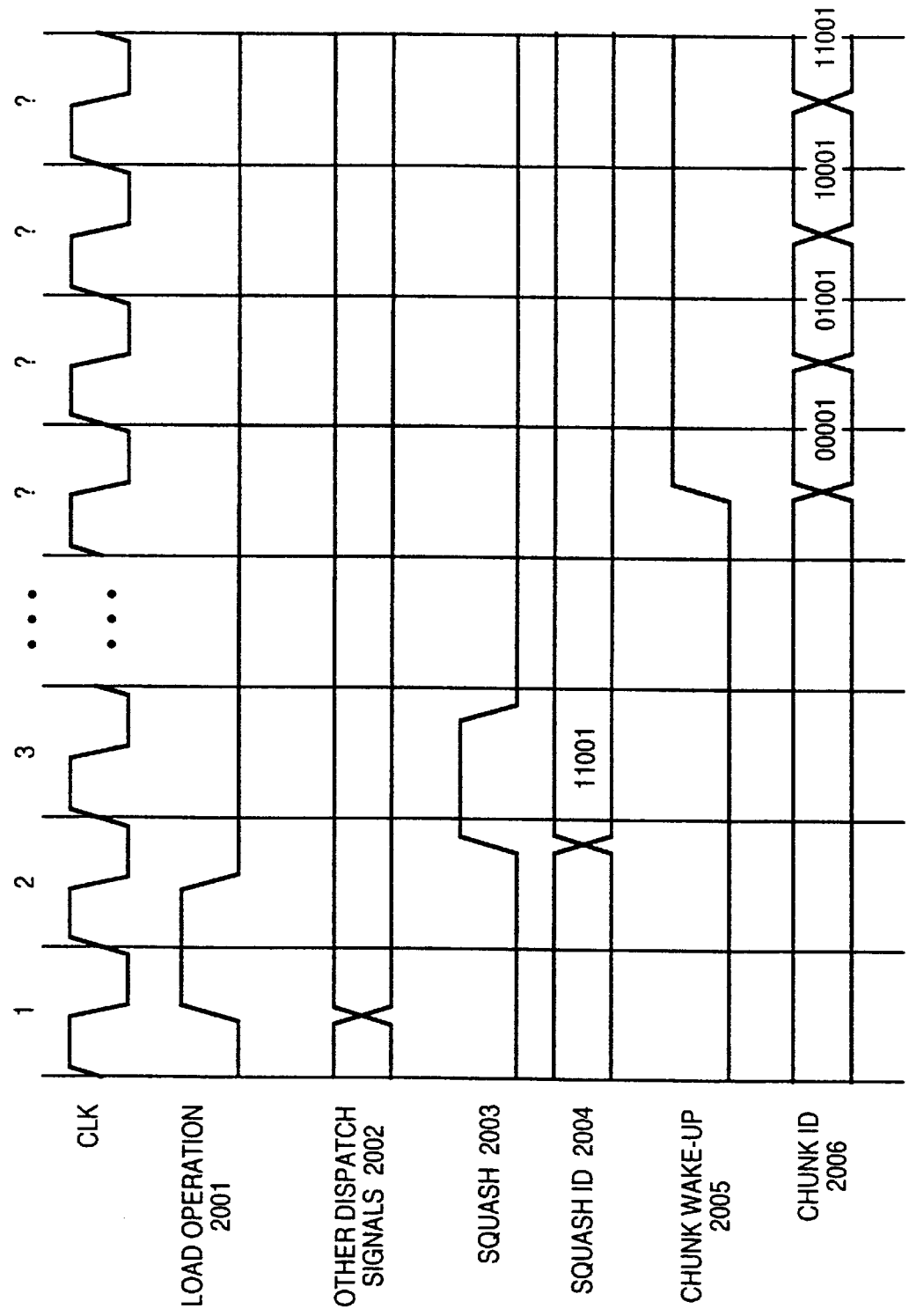
FIG_20

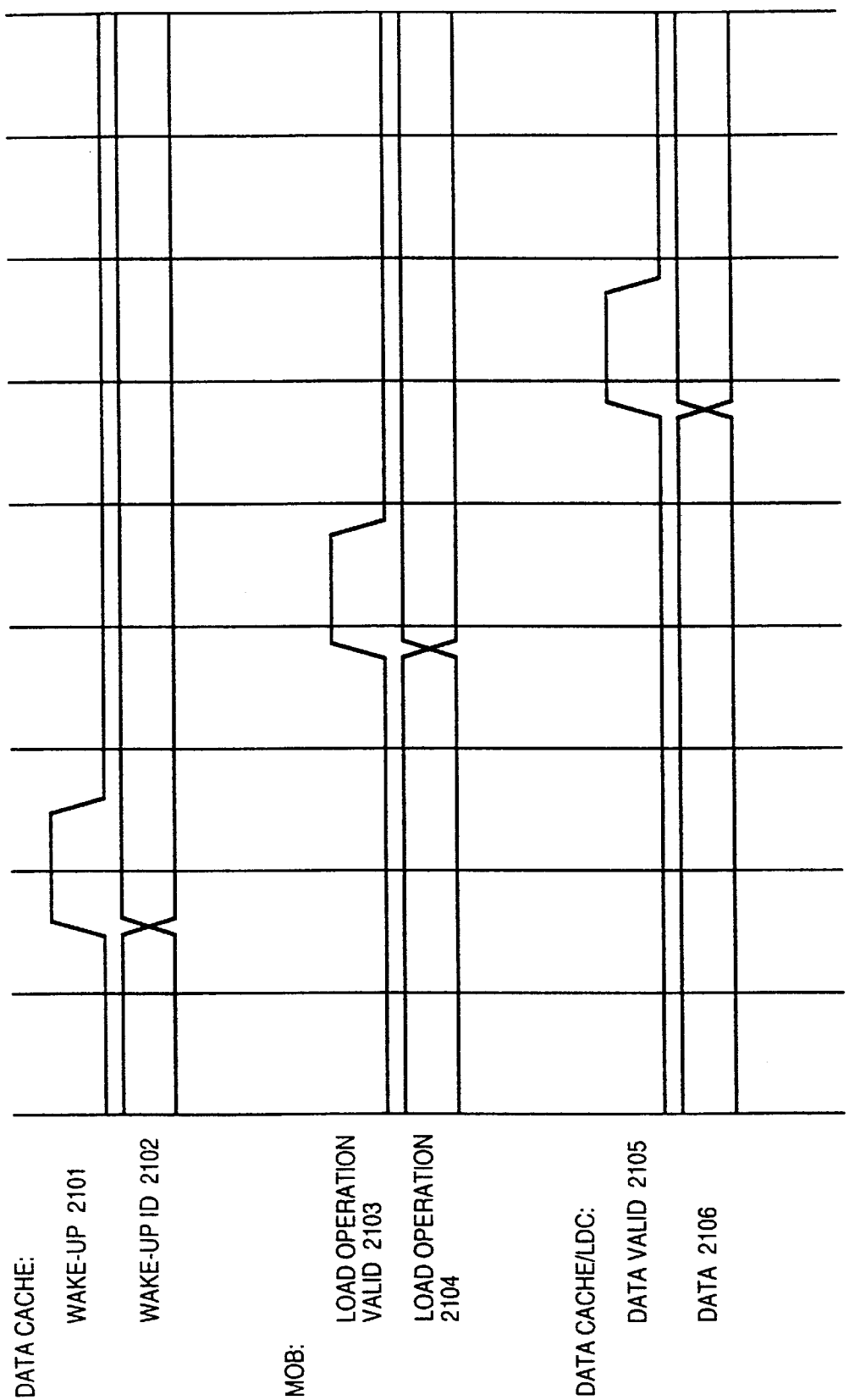

METHOD AND APPARATUS FOR BLOCKING EXECUTION OF AND STORING LOAD OPERATIONS DURING THEIR EXECUTION

This is a continuation of application Ser. No. 08/177,164, filed Jan. 4, 1994, now U.S. Pat. No. 5,724,536.

FIELD OF THE INVENTION

The present invention relates to the field of computer systems; more particularly, the present invention relates to performing load operations in a computer system.

BACKGROUND OF THE INVENTION

A computer system may be divided into three basic blocks: a central processing unit (CPU), memory, and input/output (I/O) units. These blocks are coupled to each other by a bus. An input device, such as a keyboard, mouse, stylus, analog-to-digital converter, etc., is used to input instructions and data into the computer system via an I/O unit. These instructions and data can be stored in memory. The CPU receives the data stored in the memory and processes the data as directed by a set of instructions. The results can be stored back into memory or outputted via the I/O unit to an output device, such as a printer, cathode-ray tube (CRT) display, digital-to-analog converter, etc.

The CPU receives data from memory as a result of performing load operations. Each load operation is typically initiated in response to a load instruction. The load instruction specifies an address to the location in memory at which the desired data is stored. The load instruction also usually specifies the amount of data that is desired. Using the address and the amount of data specified, the memory may be accessed and the desired data obtained.

The memory accessed in response to the load instruction may be the main system memory. Besides including a main system memory, many of today's memory systems also include a cache memory. A cache memory is a very fast local storage memory that is used by a CPU to hold copies of instructions, code or data that are frequently requested from the main memory by the CPU. Memory caches are commonly designed at two levels: a first level cache memory and a second level cache memory. Most recently, the use of third level cache memories has been discussed. The first level cache memory is usually integrated on the same integrated circuit die with the CPU, while the second and third level caches are typically integrated in separate dies, often separate chips. If the memory system includes cache memories, the cache memories are accessed before the main system memory in order to fulfill a load request.

Assuming that a computer system includes first and second level cache memories, when a load instruction is encountered, the CPU initially determines if the data resides in the first level cache. If it does (i.e., a hit), then the data is accessed and the load is completed. If it does not (i.e., a miss), then the CPU sends a request to the second level cache to determine if a copy of the data is currently being stored in the second level cache memory. If a copy of the data is contained within the second level cache memory, the data is returned to the CPU to complete the load and is stored in the first level cache memory. If a copy of the data is not present in the second level cache memory, then the memory request is sent to the main system memory to obtain the desired data. Subsequently, copies of the returned data are stored in both the first and second level cache memories.

In the prior art, many of these memory subsystems can only accommodate one load operation at a time. This is normally not a problem where there is a hit and the data is forwarded from the cache memory to complete the load operation. However, if there is a cache miss, then a bus cycle must be started to obtain data from an external source. In this case, if another access is made to the cache memory while the other memory operation is pending, the cache memory typically will not accept it, particularly where the access misses the cache. This type of cache is often referred to as a blocking cache. It is desirable to be able to access a cache memory while the cache has other memory operations pending.

Some computer systems have the capabilities to execute instructions out-of-order. In other words, the CPU in the computer system is capable of executing one instruction before a previously issued instruction. This out-of-order execution is permitted because there was no dependency between the two instructions. That is, the subsequently issued instruction does not rely on a previously issued unexecuted instruction for its resulting data or its implemented result. The CPU may also be capable of executing instructions speculatively, wherein conditional branch instructions may cause certain instructions to be fetched and issued based on a prediction of the condition. Therefore, depending on whether the CPU predicted correctly, the CPU will be either executing the correct instructions or not. Branch prediction and is relationship with speculative execution of instructions is well-known in the art. For a detailed explanation of speculative out-of-order execution, see M. Johnson, *Sugerscalor Microprocessor Design*, Prentice Hall, 1991. Speculative and out-of-order execution offer advantages over the prior art, including better use of resources. If multiple instructions are permitted to be executed at the same time, this performance benefit greatly increases.

Special considerations exist with respect to performing memory operations out-of-order in a computer system. Memory operations are ordered to ensure that the correct data is being transferred. For instance, if a store operation and a load operation have the same destination and source addresses respectively and the store operation precedes the load operation in the instruction stream, then the store operation must occur before the load operation to ensure the correct data will be subsequently loaded. If the load operation is allowed to be completed before the store operation, then the data loaded would more than likely not be the data that the store operation would have stored at the memory location. By using stale data, the computer system will not function as intended by the ordered sequence of instructions. However, out-of-order and concurrent execution of instructions may be very beneficial. Thus, it would be advantageous to execute memory operations out-of-order and concurrently except where their execution would create incorrect results.

The present invention provides a mechanism to perform memory operations out-of-order except where incorrect results are created. The present invention provides a mechanism to prevent the out-of-order execution of load operations until it is determined that the load operation loads data from a location to which an unexecuted store operation is directed. The present invention also provides a mechanism for loading data from an external memory when the data is not available in a local storage area.

SUMMARY OF THE INVENTION

A method and apparatus for performing load operations in a computer system is described. The present invention includes a method and apparatus for dispatching the load operation to be executed. The present invention halts the execution of the load operation when a dependency exists between the load operation and another memory operation currently pending in the system. When the dependency no longer exists, the present invention redispatches the load operation so that it completes.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is a flow diagram illustrating the process of the present invention.

FIG. 2A is a block diagram of the computer system of the present invention.

FIG. 3 is a block diagram of one embodiment of the execution unit of the present invention.

FIG. 4 illustrates an example of one embodiment of the addressing scheme of the present invention.

FIG. 6 is a block diagram of the relevant portions of the data cache of the present invention.

FIG. 7 is a block diagram of the relevant portions of memory interface unit of the present invention.

FIG. 9 is a block diagram depicting the interaction between the store address buffer the store data buffer and the physical address buffer.

FIG. 10 is a timing diagram of the execution of a load operation according to the present invention.

FIG. 11 illustrates the store address buffer and the tail pointer of the present invention.

FIG. 12 is a circuit schematic for generating wakeup signals to remove blocking conditions from load operations.

FIG. 13 is a circuit schematic for performing a ready bit calculation.

FIG. 14 illustrates multiple wakeup sources and the scheduler of the present invention.

FIG. 15 is a flow diagram illustrating the wakeup, schedule and dispatch process of the present invention.

FIG. 16 illustrates a sequence of load operations.

FIG. 17A is a timing diagram of the execution of a load operation.

FIG. 17B is a data flow diagram of a load operation.

FIG. 19 is a timing diagram of the dispatch, block and wake-up timing for a load operation according to the present invention.

FIG. 20 is a timing diagram of the dispatch, squash, block and wake-up timing for a load operation according to the present invention.

FIG. 21 is a timing diagram of the load wake-up and speculation dispatch according to the present invention.

DETAILED DESCRIPTION OF THE PRESENT INVENTION

Figure 2B:
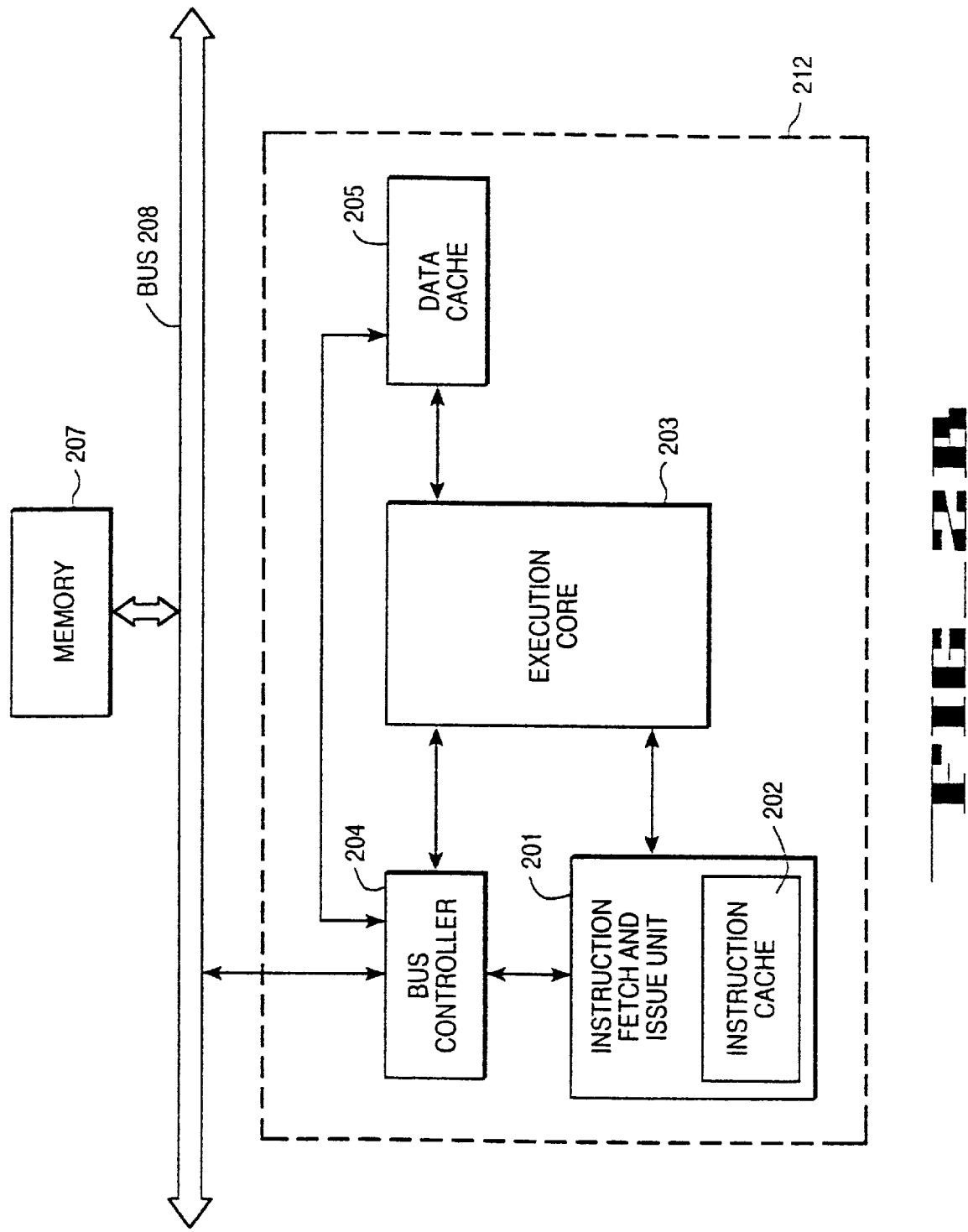
FIG. 2B is a block diagram of the memory subsystem of the present invention.

A method and apparatus for performing load operations is described. In the following detailed description of the present invention numerous specific details are set forth, such as specific number of bits, address sizes, blocking conditions, etc., in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring the present invention.

Overview of the Present Invention

The present invention includes a process and mechanism for performing load operations. The present invention performs the load operations in response to load instructions executed in the computer system. The load instructions are received and executed by a processor in the computer system. In performing the load operations, the present invention insures that there are no memory ordering violations, even though these operations may be performed out-of-order.

The process for performing a load operation in the present invention is depicted in the flow diagram of FIG. 1. Referring to FIG. 1, the load operation is initially dispatched into the memory subsystem for execution in the computer system (processing block 101). In the present invention, this dispatch occurs when there are no data dependencies on the load. A test then determines whether there are any conflicts (other than data depending conflicts) that might exist between the load operation and previously dispatched store operations which could possibly result in incorrect data being loaded into the processor as a result of the execution of the load (processing block 102). The present invention provides several mechanisms for detecting when conflicts arise, such that speculative execution may be used as much as possible. In the present invention, these conflicts may be due to address dependencies where the source address of the load operation may be the same as a distinction address of one of the currently dispatched, yet not completed, store operations. The present invention is able to track address dependencies between load and store operations by assigning an identification to each load operation to identify its relative temporal position with respect to the sequential stream of store operations. Using the identification, the present invention identifies the set of store operations, if any, that potentially conflict with the load operation. The present invention also identifies conflicts due to resource dependencies. Resource dependencies exist when a resource required for execution of the load operation is currently in use or unavailable for one of a number of reasons, such that the load operation cannot gain control of the resource for its execution.

If the present invention identifies either such a conflict or condition (e.g., a resource or address dependency), then processing continues at processing block 103, where the load is temporarily prevented, or "blocked", from completion for a predetermined period of time (e.g., the current cycle). The load operation is enabled, or "awakened" when the conditions or conflicts that resulted in the block are no longer in existence (processing block 104) and processing continues at processing block 101 when the process is repeated. If the present invention does not identify any conflicts, then processing also continues at processing block 105. At processing block 105, the load operation is dispatched to memory to retrieve the desired data.

The present invention also provides a process for performing load operations wherein multiple requests for the same cache line are satisfied with the first of such requests being sent to memory while the other requests receive their desired data upon its return in response to the performance of the first operation.

Overview of the Computer System of the Present Invention

Referring to FIG. 2A, the computer system upon which a preferred embodiment of the present invention is implemented is shown as 200. Computer system 200 comprises a bus or other communication means 211 for communicating information, and a processing means 212 coupled with bus 211 for processing information. Processor 212 includes, but is not limited to microprocessors such as an Intel Architecture Microprocessor, manufactured by Intel Corporation of Santa Clara, Calif., the corporate assignee of the present invention, Processor 212 may also be another microprocessor such as the PowerPC™, Alpha™, etc. System 200 further comprises a random access memory (RAM) or other dynamic storage device 214 (referred to as main memory), coupled to bus 211 for storing information and instructions to be executed by processor 212. Main memory 214 also may be used for storing temporary variables or other intermediate information during execution of instructions by processor 212. Computer system 200 also comprises a read only memory (ROM) and/or other static storage device 216 coupled to bus 211 for storing static information and instructions for processor 212, and a data storage device 217 such as a magnetic disk or optical disk and its corresponding disk drive. Data storage device 217 is coupled to bus 211 for storing information and instructions.

Computer system 200 may further be coupled to a display device 221, such as a cathode ray tube (CRT) or liquid crystal display (LCD) coupled to bus 211 for displaying information to a computer user. An alphanumeric input device 222, including alphanumeric and other keys, may also be coupled to bus 211 for communicating information and command selections to processor 212. An additional user input device is cursor control 223, such as a mouse, a trackball, stylus, or cursor direction keys, coupled to bus 211 for communicating direction information and command selections to processor 212, and for controlling cursor movement on display 211. Another device which may be coupled to bus 211 is hard copy device 224 which may be used for printing instructions, data, or other information on a medium such as paper, film, or similar types of media. Furthermore, a sound recording and playback device, such as a speaker and microphone may optionally be coupled to bus 211 for interfacing with computer system 200. Note that any or all of the components of system 200 and associated hardware may be used in a preferred embodiment, however, it can be appreciated that any type of configuration of the system may be used for various purposes as the user requires.

FIG. 2B is a block diagram of the memory subsystem of the computer system of the present invention. Referring to FIG. 2B, the memory subsystem comprises an instruction fetch and issue unit 201 with an integrated instruction cache 202, an execution core 203, a bus controller 204, a data cache memory 205, a memory unit 207, and a bus 208.

The memory unit 207 is coupled to the system bus. The bus controller 204 is coupled to the bus 208. The bus controller 204 is also coupled to the data cache memory 205 and the instruction fetch and issue unit 201. The instruction fetch and issue unit 201 is also coupled to the execution core 203. The execution core 203 is also coupled to the data cache memory 205. In the present invention, the instruction fetch and issue unit 201, the execution core 203, the bus controller 204, and the data cache memory 205 together comprise the processor 212 (FIG. 2A). In the present invention, elements 201–205 cooperate to fetch, issue, execute and save the execution results of instructions in a pipelined manner.

The instruction fetch and issue unit 201 fetches instructions from an external memory, such as memory unit 207, through the bus controller 204 via bus 208, or any other external bus. The fetched instructions are stored in instruction cache 202. The bus controller 204 manages transfers of data between external components and the processor 102. In addition, it manages cache coherency transfers. The instruction fetch and issue unit 201 issues these instructions in order to the execution core 203. The execution core 203 performs arithmetic and logic operations, such functions as add, subtract, logical AND, and integer multiply, as well as memory operations. Some instructions are fetch and issued speculatively.

The execution core 203 includes an execution unit that holds and executes the integer and floating point instructions when their operand dependencies on execution results of preceding instructions are resolved, including those integer and floating point instructions that are speculatively fetched and issued. Similarly, the execution core 203 also includes a memory execution unit that holds, executes and dispatches load and store instructions to the data cache memory 205 (as well as external memory) as soon as their operand dependencies on execution results of preceding instructions are resolved, including those load and store instructions that are speculatively fetched and issued.

The data cache memory 206 respond to the load instructions immediately, forwarding data if necessary, whereas the store instructions are buffered. In other words, the instructions are not necessarily executed/forward in the order they were issued, and some instructions are speculatively executed/forwarded. However, the execution results of the integer, floating point and load instructions are buffered, and then committed to processor state in program order. The buffered store instructions are committed to processor state in program order and then executed in the "background", at the convenience of the memory system. Speculative integer, floating point and load execution results and buffer stores of mispredicted branches are purged. Note that the speculative nature of fetched, issued and executed instructions is attributed to the uncertainty of whether a particular instruction or set of instructions is to be executed due to an unaffirmed branch prediction.

Instruction fetch and issue unit 201 is intended to represent a broad category of instruction fetching and issuing elements found in many computer systems. Their constitutions and functions are well-known and will be described only as necessary with reference to later figures.

The bus controller 204, the bus 208, and the memory 207 are also intended to represent a broad category of these elements found in most computer systems. Their functions and constitutions are well-known and will not be described further. The execution core 203, incorporating with the teachings of the present invention, and the data cache memory 205 will be described further in detail below with additional references to the remaining figures.

FIG. 3 is a block diagram of one embodiment of the execution core of the present invention. Referring to FIG. 3, execution core 203 comprises a reservation station (RS) 305, a memory execution unit MEU 300, an integer execution unit (IEU) 302, a floating point execution unit (FEU) 303, a memory interface unit (MIU) 304, a reorder buffer (ROB) and real register file (RRF) 306. Additionally, execution core 203 includes an internal bus (Bus_EU) 307 and a writeback bus 308. MEU 300, AGU 301, IEU 302, FEU 303 and MIU 304 are all coupled to reservation station 305 via a dispatch bus 309. They are also coupled to writeback bus 308. MIU 304 is also coupled to the data cache memory and MEU 300 via bus 310. RS 305 is coupled to the writeback bus 308 and the Bus_EU 307. RS 305 is also coupled to ROB and RRF 306. ROB and RRF 306 is also coupled to the Bus_EU 307 and the writeback bus 308. Together, elements 300–310 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 203 may include multiple IEUs, such as two, and multiple FEUs, such as two.

Reservation station 305 receives and stores the issued instructions resolving their operands with data from the IEU 302, the FEU 303, the data cache memory, the ROB and RRF 306 and holds them until their operands are all resolved. The RS 305 then dispatches the issued instructions to the AGU 301, the IEU 302, the FEU 303 and the MIU 304 and the MEU 300 as appropriate.

In particular, the load instruction is dispatched as a single operation, whereas the store instruction is dispatched as store address (STA) and stored data (STD) operations to the MEU 300 and MIU 304. Similar to instruction fetching, there is no requirement that the load sources or the store destinations be aligned to memory locations. In other words, the load sources of load instructions and store destinations of store instructions may span two cache lines (or two pages).

The MEU 300, the IEU 302, FEU 303, and the MIU 304 in turn perform their operations accordingly. The execution results of the integer, floating point and load instructions are held in the ROB 306, and then committed by RRF 306 in the order these instructions were issued. Speculative execution results of the mispredicted branches are not committed, but instead are held in the ROB 306 and purged upon their detections.

Figure 5:
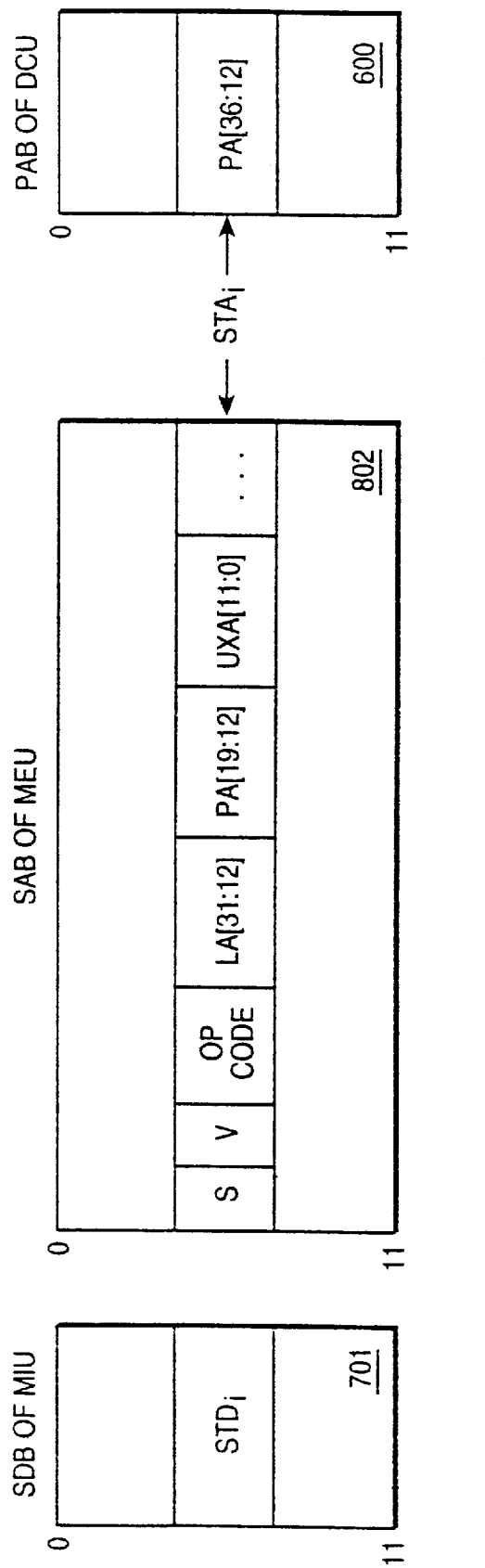
FIG. 5 is a block diagram of the relevant portions of the cache controller of the present invention.

FIG. 5 depicts a block diagram of the relevant portions of one embodiment of the memory execution unit (MEU) of the present invention. Referring to FIG. 5, the MEU 205 includes AGU 301, page miss handler 501, memory order buffer (MOB) 503, and translation lookaside buffer (TLB) 504, as well as memory dispatch 502 and the writeback bus 308. PMH 501 is coupled to the memory dispatch bus 502, writeback bus 308, and TLB 504. MOB 503 is coupled to the reservation station, memory dispatch bus 502, writeback bus 308, the data cache memory and TLB 504. TLB 504 is also coupled to memory dispatch bus 502, writeback bus 308 and the data cache memory. Memory dispatch bus 502 and writeback bus 308 are also coupled to the data cache memory. AGU 505 is coupled to MOB 503, the writeback bus 308, and the dispatch bus 309.

The AGU 505, MOB 503, PMH 501, and TLB 504 control all load accesses to the data cache memory and, in turn, the memory of the computer system. The AGU 505, MOB 503, PMH 501, and TLB 504 also execute the STA portion of the store. Specifically, MOB 503 buffers the results of the STA execution for the eventual store dispatch to the data cache memory.

The AGU 505 generates the appropriate linear address for the memory operations. The AGU 505 computes the linear address using a base address, a displacement value, a scale value, an index value and a segment value. In one embodiment, the linear address is 32-bits long with a 20 higher order bits identifying a memory page and the 12 low order bits identifying the off-set within the memory page. An example of such an addressing scheme is shown in FIG. 4.

TLB 504 translates the 32-bit linear address into a 36-bit physical address with 24 higher order bits indicating the memory page, as shown in FIG. 4, and forwards misses to PMH 501. In response, PMH 501 performs page walking and other well-known page miss handling functions. The MOB 503, incorporated with the teachings of the present invention, controls dispatching, buffers all store and load operations, tracks their progress as they move through execution, and then retires/commits them to permanent architectural state as appropriate. MOB 503 then causes the retired/committed stores to be executed in due course "background" at the convenience of the memory system.

Additionally, MOB 503 responds to load operations by forwarding buffered data as necessary. When an operation is dispatched and cannot complete due to some address or resource conflict, MOB 503 blocks the operation and stores the dependency information. MOB 503 redispatches block operations when the blocking source is removed. Some memory operations cannot execute speculatively, MOB 503 controls the necessary monitoring and dispatched these non-speculative operations at the correct time. For instance, MOB 503 snoops the source addresses of instructions fetched and generates a single stall signal for the bus controller to stall an instruction fetch whenever the source address instruction being fetched substantially matches any of the addresses of the store destinations of the buffered stored instructions.

The TLB 504 and the PMH 501 are intended to represent a broad category of these elements found in most computer systems. MOB 503 will be described in further detail below with additional references to the remaining figures.

FIG. 6 is a block diagram of one embodiment of the data cache memory of the present invention. Referring to FIG. 6, the data cache memory 206 comprises a physical address buffer (PAB) 600, data tag array 601 and a data array 602 and queue 603. PAB 600 is coupled to receive an input (e.g., the physical address) from the TLB of the MEU and is coupled to produce physical address to tag array 601. Tag array 601 is coupled to receive an input (e.g., either store address or load address) from the MOB of the MEU. Data array 602 is coupled to receive an input from tag array 601 and the store data buffer (SDB) of the MEU, as well as being coupled to the bus controller. In response, data array 602 produces an output to the execution core. Queue 603 is also coupled to tag array 601 and data array 602. Queue 603 is also coupled to receive an input from the MOB as well as the bus controller.

The PAB 600 receives and saves the 24 high order bits of the translated physical addresses from the TLB of the MEU for the store and load operations, and in cooperation with the MOB and MIU, commits them to processor state and executes them as appropriate. Data tag array 601 stores the physical address tags of the data currently being cached in data array 602 and tag matches the accessing physical addresses against the stored physical address tags. Data array 602 receives and stores the data currently being cached and responds to data loads. In one embodiment, data tag array 601 and data array 602 have sufficient capacity for storing 128 sets of 2-way set associative 32-byte cache lines of data and their corresponding address tags. PAB 600, in cooperation with the MOB of the data cache controller, will be discussed in further detail below. TAG array 601 and data array 602 are intended to represent a broad category of these elements found in most computer systems, whose functions and constitutions are well-known and will not be further described.

Queue 603 contains accesses to data cache memory 206 that miss the cache memory and are currently pending on the bus. The entries in queue 603 are also checked where the data cache memory is accessed to determine if the desired data is stored in one of its entries or there is a request for that cache line currently pending on the bus. Queue 603 includes storage locations for temporarily storing the data returned for those pending operations. Queue 603 supplies the data and its tag information to data array 602 and tag array 601 respectively. In one embodiment, the queue 603 includes four entries having a 256 bit width (one cache line).

FIG. 7 is a block diagram of one embodiment of the relevant portions of the MIU of the execution unit of the present invention. Referring to FIG. 7, the MIU 304 comprises a store converter (STC) 700 and a store data buffer (SDB) 701, coupled to each other, such that store converter 700 receives data from the reservation station of the execution unit and sends data to SDB 701. SDB 701 then sends the data onto the data cache memory.

The STC 700 converts the floating point data of the STD operations. The SDB 701 receives and stores the STD operations and in cooperation with the store address buffer (SAB) of the data cache controller, and the PAB of the data cache, retires/commits the STD operations as appropriate, and causes them to be executed. The functions and constitutions of the STC 700 are well-known and will not be further described. SDB 701 and its cooperation with the SAB and PAB, will be described in further detail below.

Figure 8:
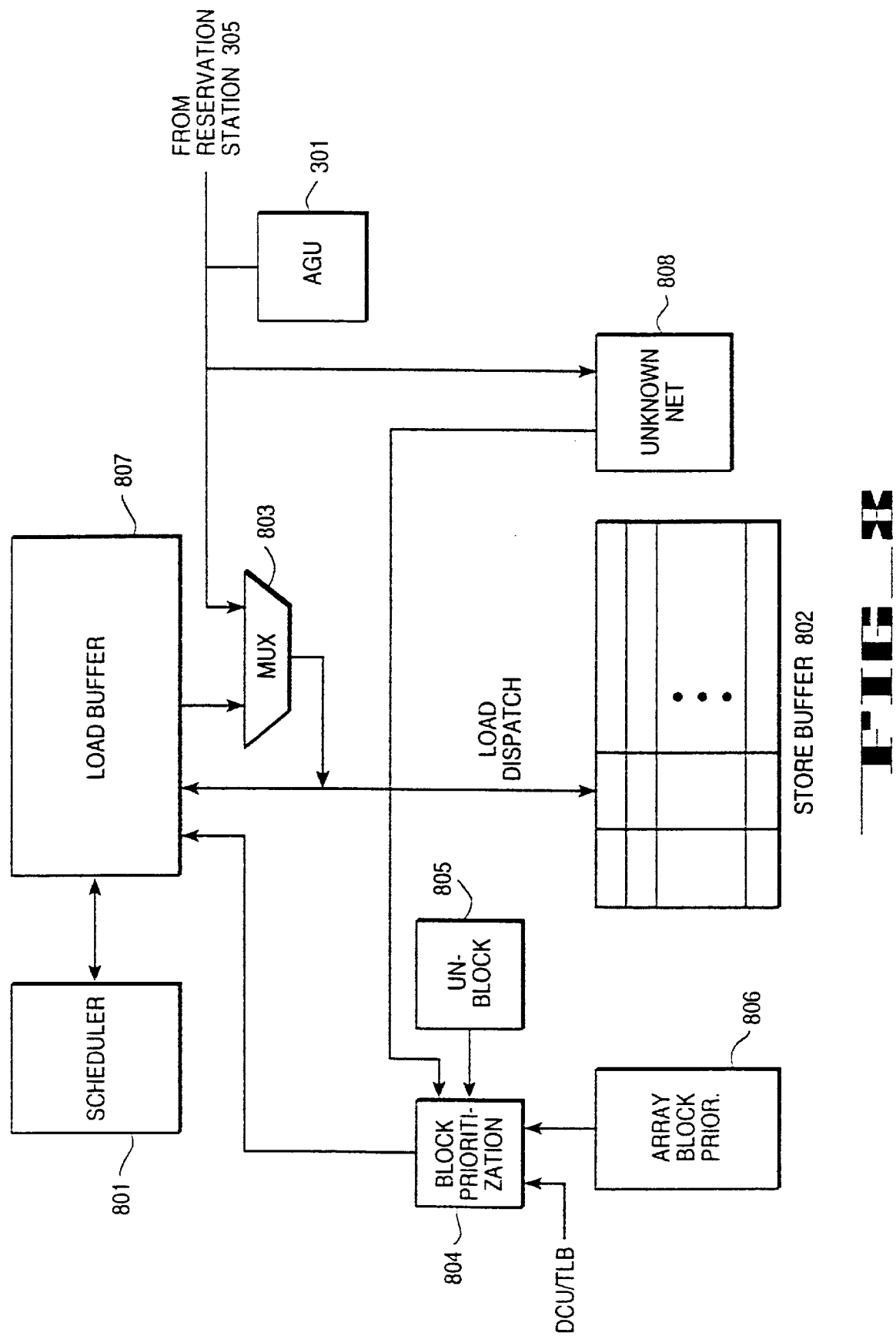
FIG. 8 is a block diagram of the relevant portions of the memory order system of the present invention.

FIG. 8 is a block diagram of one embodiment of the relevant portions of the memory order buffer (MOB). Referring to FIG. 8, the MOB comprises scheduler 801, load buffer (LB) 807, multiplexer (MUX) 803, block prioritization logic 804, unconditional block 805, array block prioritization 806, store buffer 802, and unknown net block 808. Scheduler 801 is coupled to load buffer 807. Load buffer 807 is coupled to block prioritization 804, store buffer 802 and MUX 803. Block prioritization logic 804 is also coupled to receive an input from the TLB and the data cache memory, unknown net 808, array block prioritization 806 and unconditional block 805. Unknown net 808 and MUX 803 are also coupled to the reservation station via the dispatch bus.

The SAB 802 stores the remaining operands and partial replications of the page denoting portions of the store destination addresses of buffered STA operations. The SAB 802, in cooperation with the SDB of the MIU and the PAB of the data cache memory, retires/commits the STA operations as appropriate, and causes them to be dispatched.

LB 807 also is coupled to receive a copy of the load operations dispatched form the RS via MUX 803. Load operations are copied into LB 803. LB 803 provides the stored load operations to the TLB and the execution pipe upon dispatch. MUX 803 receives loads from load buffer 807 and from the dispatch bus and outputs one for dispatch to memory.

Unknown net 808, unconditional block 805 and array block prioritization 806 determine if a specific set of condition exist that would cause or require a particular load operation to be prevented from executing. Each of these will be described below later. Block prioritization logic 804 receives conflicts/conditions/identification signals to block load and initiate operations stored in LB 807. Block prioritization logic indicates the status of load operations through signals sent to LB 807. Scheduler 801 schedules load operations for dispatch to memory based on their status.

FIG. 9 is a block diagram of one embodiment of the PAB, the SDB and the SAB. The PAB 600, the SDB 701 and SAB 802 all comprise an equal number of buffer slots. In one embodiment, up to a maximum of 12 buffer slots are included. The STD and STA operations of the store instructions are stored in corresponding buffer slots of the PAB 600, SDB 701 and SAB 802. More specifically, the 24 high order bits of the physical address (PA [36:12]) are stored in the buffer slot in the PAB 600. The STD operation is stored in a corresponding buffer slot and the SDB 701. The STA operation, including the valid bit, the OP code, the 20 high order bits of the linear address (LA [31:12]), and the 12 page offset designating bits of the address (UXA[11:0]), is stored in a corresponding buffer slot in the SAB 802. Additionally, the 8 lower order bits of a page designated portion of the physical address (PA[19:12]) of the STA operation are replicated in the buffer slot in the SAB 802. The STD and STA operations of most store operations are promoted to a "senior" state, i.e. ready for retirement or commitment, in due course, when their respective preceding instructions have been retired/committed or promoted to the "senior" state. The "senior" STD and STA operations are then executed in the "background" in due course when the data cache is free and then purged from the SDB 701, the SAB 802 and the PAB 600. The STD and STA operations of some of the store instructions, such as those storing data to memory locations mapped to I/O devices, are not eligible to be promoted to the "senior" state. The store data and store operations of these store instructions are retired/committed, and purged from the SDB 701, the SAB 802 and the PAB 600 concurrent with their executions. In other words, when the target I/O devices are ready to accept the data being "stored", then the execution occurs. In one embodiment, the linear addresses are driven from the SAB 802 to the TLB again, and the newly generated PA is directly provided to the tag array of the data cache, bypassing the PAB of the data cache memory. Additionally, if a store instruction involves storing data to memory locations spanning two cache lines, the data cache controller signals the data cache memory, and the STD and STA operations are driven to the data cache memory twice, with the data size and the physical address being adjusted accordingly the second time.

Performing Load Operations

In the present invention, a load operation is performed in response to a load instruction. The load instruction is received by the instruction fetch and issue unit which decodes the load instruction. The issue and fetch unit sends the decoded load operation to the reservation station for dispatch to the memory subsystem when any data dependencies between the load operation and other microoperations are resolved.

Once in the memory subsystem, the linear address for the load can be either bypassed directly from the AGU or can come from the MOB load buffer. The upper 20 bits of the linear address are translated by the DTLB into a physical address. The data cache memory uses these physical address bits along with the lower 12 bits of the untranslated address to do a tag array look-up and data array read (if needed). If the load hits the cache memory, then the data is read out of the data cache memory data array, aligned and then passed on to a load converter (not shown to avoid obscuring the present invention). The load converter then converts the data into the proper internal format recognized by the processor and writes it back on the writeback bus. If the load misses the data cache memory, a request for data will be made to the bus controller. After the data is retrieved by the bus controller, either from an L2 cache memory or external memory, the data cache memory requests a cycle on the writeback bus to return the requested data. When the data cache memory has received a grant for a cycle or the writeback bus, it forwards its data to the load converter which drives it on the writeback bus after format conversion.

When performing load operations in the present invention, the load operation is dispatched for execution to the memory subsystem. Once a load operation has been dispatched, the data cache memory and the DTLB also begin providing a blocking status, while the MOB detects one or more address conflicts. Using the blocking status condition and the address conflict information, the MOB prioritizes the conditions and conflicts to determine if the load operation should be allowed to continue in execution. If the load cannot be completed due to a conflict, it is halted, or blocked. That is, the DCU aborts the load request. In this case, the MOB creates a block code identifying the event that must occur, if any, before the load can be completed. Once the appropriate event has been observed, the load operation may "wake up" and be redispatched for execution.

Once a load has been awakened, there is no guarantee that it will complete during the next execution cycle The load operation may not complete because it may be blocked again for the same or different reasons. For example, a load may be blocked by the MOB on its initial dispatch because of an address conflict with a store operation that has been dispatched previously and is currently pending. When the operation that generates that address is dispatched, the load operation is awakened and redispatched. The redispatched load may be blocked by the data cache memory due to a pending load operation for the same cache line for a different load currently executing in the system. When the appropriate data is returned, the load operation will wake up and be redispatched. Once redispatched, the load may block again, or complete with returned data.

The load operations that are blocked are stored in the load buffer. In one embodiment, the load buffer contains sixteen entries. Therefore, at most 16 load operations can be pending in the processor at any one time. As many as 16 load operations may "wake up" in a given cycle. Since only one load is dispatched every cycle (in the preferred embodiment), the MOB must queue the load operations that are awake for dispatch. Queuing is performed by the load buffer by tagging loads as "ready" when they wake up. The load buffer then schedules for dispatch one of the "ready" loads each cycle. This ready/schedule mechanism allows the throughput of one load scheduled per cycle.

Thus, the memory of the system is organized such that it receives the loads dispatched to the memory subsystem one per cycle. The MOB performs multiple load blocking checks during this time to determine if load can be executed without conflicts (since the reservation station dispatches purely on data dependency). Checking for address and resource dependencies, the MOB gathers all the blocking conditions and prioritizes them to determine the highest priority. The load operation is stored and tagged with the block code and prevented from completion if a conflict exists (e.g., it is blocked). The operation of the memory system is monitored to determine when the conditions causing a particular load to be block no longer exist. At this time, the load is allowed to redispatch.

In one embodiment, the memory execution model is a three stage pipeline. The pipeline is shown in FIG. 10. Referring to FIG. 10, a load operation enters the execution pipeline in the first clock cycle when it is dispatched by the reservation station. In the second cycle of the execution pipeline, some blocking checks (BLOCK1) are performed as well as the TLB access. In performing its access, the TLB supplies information to the data cache memory and the data cache memory begins its memory cache lookup. In the third cycle, the remainder of the blocking checks (BLOCK2) are completed. The blocking checks from the second cycle are grouped into one set with the blocking checks performed in the third cycle to produce status bits that indicate whether the load is to be blocked. Also in the third cycle, the access to the data cache memory is completed.

Specifically, with respect to the second clock cycle, the TLB performs the linear address to physical address translation in the first half of the second cycle in a manner well-known in the art. The translation operation performed by the TLB will not be described further in detail. In addition to returning the physical address, the TLB returns status information based on the TLB translation (e.g., translation performed correctly) and the memory type. In one embodiment, the TLB indicates that the translation resulted in a fault, a page miss, a blocking condition or a valid linear address (e.g., translation performed correctly). The fault and miss indications are well known to those in the art and are not to be described in further detail herein. If the address cannot be translated, then a blocked status is generated by the TLB. For instance, in the present invention, a page miss may occur where the page mishandler is busy. In this case, the load operation must be halted, or blocked. Another example occurs when there is a linear address miss and a replacement in the TLB at the same time. Here, a blocked status is produced for the load operation. The specific conditions causing the TLB to generate a blocked status are dependent on the implementation of the paging system.

The memory type is also returned during the second cycle, along with the physical address. The different memory types include: normal cache speculative memory, uncacheable memory, non-speculative memory (e.g. memory mapped I/O). The speculative nature of the memory type depends on whether accesses to that location may be performed out-of-order. If so, then that location is speculative, while if not, then the location is non-speculative, such as in the case of a direct mapped I/O location. The different memory types are ascertained from a set of registers in the PMH that contain the memory type which are located according to the physical memory space as determined using the physical page address. The memory type for the load is stored in the TLB.

Besides the physical address, memory type and the TLB status, other signals are generated during the second cycle and received by the MOB. For instance, a MOB block signal is generated indicating that an address dependency exists. A linear address calculation fault indication signal is generated by the AGU and received by the MOB as well. The linear address calculation fault is generated as a result of a segment violation or other bus or dependent exception that indicates the linear address is invalid and has a fault.

Also during the second cycle, the data cache memory begins its access using the lower bits of the linear address. The bits utilized are that portion of the address that does not undergo the TLB translation. The remainder of the physical address is received fairly early from the TLB. The cache memory access continues into the third cycle. If a cache miss occurs, then potentially one of these two conditions may exist: a block or a squash. A block occurs, referred herein as a data cache memory block, when the cache memory is unable to buffer the load operation and blocks its completion. This is due to multiple memory operations already pending completion on the system bus. A data cache memory block condition may also be asserted for several other reasons. For instance, if there is a pending snoop to the cache line that is already being accessed at that time, then a data cache memory block condition exists. A squash, herein referred to as data cache memory squash, occurs if there is already an access to the same cache line. This provides a performance gain since a second bus request or buffer (e.g., queue 603 in FIG. 6) does not have to be allocated.

Also, in the third cycle, the MOB receives all the blocking information status signals and combines them to produce a load status. Also during the third cycle, the data cache memory completes its access and sends data to the load converter for its final conversion and writeback unless there is an earlier block or fault signal that aborts the cache memory access.

The status of the load operation is written into the load buffer. In one embodiment, the load status may be one of four designations: invalid, valid and completed, valid and blocked, or valid and not blocked. Each load gets written into its load buffer with the status and the load buffer uses these status bits to determine when the load operation is to execute in subsequent cycles. If there are no blocks or faults or other similar associated conditions/conflicts, then the load operation is sent to the data cache memory and assigned a load status of valid and completed. It should be noted that this does not necessarily mean that the load operation has been executed. With respect to writing back to the reservation station and ROB, the load operation has not completed (e.g., because there may have been a cache miss). From the MOB's standpoint, however, it is completed and no further action needs to be taken by the MOB. If a fault occurs with respect to the load operation, it is marked as valid and completed. Note that these faults may be indicated by the TLB or an AGU. The load may not have actually happened, but as far as the MOB is concerned the operation has been completed. If a page miss occurs with respect to the load operation, then the load operation is marked invalid. In the case of a page miss, the page miss handler processes the page a page walk and redispatches the load.

The valid and blocked and the valid and not blocked status are a function of multiple conditions and conflict determinations. The MOB, TLB and data cache memory provide the information to determine whether or not the status should be blocked or not. In one embodiment, these different conditions are prioritized to allow a general information field for determining when to redispatch a load operation.

Load Execution and Blocking Conditions

In the present invention, the block conditions are based on address dependencies and resource dependencies. The present invention determines whether there are any possible address dependencies that may prevent the load operation from executing out-of-order. The results of the determination are combined to generate one or more MOB block signals that indicate whether a conflict exists between the load operation and another store operation and, if so, which store operation presents the conflict. The present invention determines resources conflicts by examining the data cache memory to determine if the data cache can accommodate the load operation and/or whether there is a read of the same cache line currently taking place in the cache memory. The present invention also determines if resource conflicts by examining the PMH and the TLB. The present invention also determines whether there is a linear address calculation fault. Using this information, the present invention is able to determine if the load status should be blocked or not.

Address Dependencies and the MOB Block Signals

The present invention begins determining if an address dependency exists through the use of store coloring. The present invention performs store coloring to track dependencies between load and store operations. Store coloring is performed by the issue and fetch unit when an instruction is being issued. In the present invention, a store buffer identification (SBID) is assigned (tagged) to each load operation during decoding. In one embodiment, the SBID includes five bits (including a wrap bit). The SBID points to the entry in the store buffer where the most recent store operation remains until it writes to memory. Store buffer entries are allocated sequentially to the store operations as they are issued. Each memory load operation is tagged with the SBID of the most recent store operation. Thus, the SBID assigned to the load operation defines the youngest store operation that is older than the load operation itself. In the present invention, by knowing which store operations are older than which load operations, possible dependencies may be identified. By identifying the dependencies or a lack thereof, the present invention is able to determine when each of the loads may be executed. More particularly, the present invention uses the relative temporal location of the load operations with respect to the store operations to determine whether subsequently issued load operations may execute before prior issued store operations.

In store coloring, each store operation is written into a distinctive entry of the store buffer. As the store buffer has a limited number of entries, the buffer includes an additional bit, referred to as a wraparound bit, which indicates whether the buffer is implementing a wraparound feature. That is, after the last store buffer entry is allocated, the present invention continues allocation from the top of the buffer, thereby effectively wrapping around the end of the buffer. The wraparound is used for two reasons: to detect the empty versus full condition and to tell whether the load operation is pointing to a store operation that is already dispatched versus a store which is gone into lower entry in the buffer yet is really younger.

The store buffer includes a pointer, referred herein as the tail pointer, which points to the oldest store in the machine. It should be noted that the stores in the store buffer are allocated in the order of their dispatch from the reservation station in order, but not necessarily dispatched in their original program order. However, they are usually in order, if not very close, because they do not have the dependencies that would generally delay them in the reservation station. When a load is dispatched, the store color of the load operation points to a particular entry in the store buffer.

During the first cycle of dispatch, using the store color of the load operation, the present invention determines if the store buffer has any invalid store addresses that are older than the load operation. In the present invention, this determination is made by checking STA entries in the buffer (where each STA is a operation that produces the destination address of a store). Since load operations cannot pass store operations with unknown addresses, the present invention uses this check to block the load operation until the STA has been dispatched from the reservation station, i.e. until the address has been calculated. To determine if the store operation is older, the present invention uses address detection to search the store buffer from the tail pointer (oldest store in the store buffer) to the store operation pointed to by the SBID assigned to the load operation. This region will hereinafter be referred to as the tail region. If an entry has an invalid address, then a signal (e.g., a bit) is asserted with that SBID. In the present invention, this signal (e.g., a bit) produces an signal, referred herein as the unknown net signal, which is a logical 0 when the address is not valid and a logical 1 when it is. If the address is not valid, the load operation is tagged with the SBID of the store operation having the invalid address, preventing the load from dispatching until that STA has been dispatched from the reservation station. Note that if more than one entry in the tail region of the store buffer has an invalid address, it is the SBID of the closest STA in the tail region to the tail pointer of the store address buffer.

FIG. 11 illustrates an example of the store buffer entries taking part in the unknown net check. Referring to FIG. 11, the tail pointer 1101 of the store address buffer is at entry 3, and the store buffer contains valid STA operations in entries 3, 4, 6, 9, 10 and 11, indicated by the shaded valid entry locations. (Note in the present invention the validity of an entry may be marked by a logical 1 or logical 0 being stored in a buffer location corresponding to the particular entry.) A load operation with a store color of 10 is dispatched from the reservation station. The tail starts at entry 3, and searched downward, ending at entry 10, the loads store color. The first STA operation that is invalid is 5, and that is the SBID that is returned.

It should be noted that in the currently preferred embodiment, this check for invalid store buffer addresses only occurs once, at that time of dispatch from the reservation station. As will be described below, the remaining block and conflict checks are performed each time the operation dispatches to the memory system, such that a load may be blocked and redispatched basically going through the pipe stages repeatedly before being allowed to execute.

Once the store color has been identified, then the store operations starting from the store operation having the same SBID to the oldest unexecuted store in the store buffer, marked by the tail pointer, are checked to determine whether there should be potential load blocking. These checks occur in the second cycle of execution.

During the second pipeline stage, the present invention performs a check between the lower address bits 11:3 of the address of the load with bits 11:3 of the store addresses within the tail region (labeled search space 1102) from the store buffer entry having the same store color and the tail pointer 1101. This check creates an array block by determining the latest store operation that may pose a potential conflict. The result of this check is the generation of an array block indication signal. If the check determines there is a conflict, then the signal is at a logical 1, while if there is no potential conflict, the signal is at a logical 0.

In one embodiment, the array block signal may be asserted for each of the entries in the store buffer in response to either one of four separate conditions or address conflicts. All entries independently determine if they have a block condition against the load. The blocks of the entries are then prioritized starting with the store color of the load operation and ending with the tail pointer of the store address buffer. In other words, only stores older than the load are considered and the youngest blocking store older than the load causes the array block (i.e., the other direction of the unknown net check).

First, the array block signal is asserted when an invalid address is contained in the store buffer entry. If the entry in the store buffer does not have a valid linear address (and a valid STA microoperation), then the array block signal is asserted. The array block indication signal is asserted because it is assumed that the addresses conflict.

The array block signal for an entry in the store buffer may also be asserted if bits 11:3 of the load operation match the same bits in the address of the store. Since these bits represent the same for both the linear and physical addresses, there is a possibility that the load and store are to the same address. Therefore, in this case, the array block indication is asserted.

An array block condition also exists if the load address minus 32 matches the stores address with respect to bits 11:3 and the store operation is a split access. The split access exists when the store operation spans two cache lines. This is referred to as a cache line split. In the preferred embodiment, since each cache line is 32 bytes, a cache line split is an access that crosses a 256-bit boundary. In the preferred embodiment, a split access also occurs when the store access crosses two 64 bit boundary. When stores are split, the store entries are marked with a tag to identify them as split accesses.

The array block indication signal is also asserted for stores that are all blocking. Stores that are all blocking block all loads irrespective of the type of load. For example, if the store is to memory mapped I/O, then the store might actually write to memory, thereby changing the configuration of your memory. In this case any load that would be allowed to execute out of order may potentially cause incorrect data to be returned from memory. Another category of all blocking store operations include fence operations which are used to synchronize the operation of the processor. A store address fence operation stops all memory access and retires everything up to the store fence. That is, the fence operation prevents all loads from dispatching until it has been dispatched and has completed execution. If the entry in the store buffer contains an all blocking description, then the array block indication signal is asserted during this second condition check.

An array block indication signal is also asserted if there is a linear address match and an overlapping access. That is, if bits 11:3 of the load does not equal bits 11:3 of the stores, but there is an overlapping access. In this case, the array block indication signal is asserted.

All of the array block conditions are qualified by a block enable. In this case, the array block signal is asserted if:

---
Address Valid = 0 OR
(Block Enable = 1 AND All block = 1) OR
(Block Enable = 1 AND Linear Address Matches = 1 AND
  Overlapping Access) OR
(Block Enable = 1 AND Split Store Address Match).
---

In one embodiment, the information required to perform the array block check is stored in each entry of the store buffer. The store buffer includes storage locations for a valid bit, a block enable bit, and all block bit, address information and a split bit. These bit locations provide status for each entry. Note that the information is written into the store buffer at STA dispatch, at which time the MOB writes the information into the buffer.

With respect to the block enable bit, if the store operation faults, its blocking enable is turned off (e.g., set to a logical 0). If a fault occurs, the linear address cannot be guaranteed accurate. Thus, the entry is not allowed to participate in blocking. It should be noted that this does not adversely influence the processor since all the information sequentially following the fault will be purged anyway. In another embodiment, all stores in the store buffer may participate in the store blocking. The result of the array block condition detection is a valid store buffer ID of the most significant entry (i.e., the youngest) that causes a blocking condition on the load between the store color of the load and the tail pointer of the SAB.

Also during the second cycle, a third check is performed to determine if another blocking condition, referred to as unconditional block, exists. In one embodiment, the unconditional blocking detection occurs in parallel with the array block detection. The unconditional block check is based on the load, as opposed to being based on the store as with the array block check.

In one embodiment, if the load is a split access and is being dispatched speculatively, then an unconditional block exists and the load is blocked. The MOB determines and signals is a dispatch is speculative. Note that the present invention does not handle split access cases for a load due to the amount of address comparison that is required. If the load is a split access, twice as much address comparison is required for processor ordering. In certain embodiments, the performing of split accesses need not be considered criteria for blocking.

An unconditional block is also signaled if the load is a split access and one or more store operations are temporally in front of the load in the instruction stream, i.e. a split access requires all prior stores to be executed. Furthermore, if the memory type of the load is unspeculable and its being dispatched speculatively, then the load is unconditionally blocked. Lastly, the present invention detects an unconditional block condition if the memory type of the load is unspeculative and there are one or more stores which precede it. This determination is also made in the second cycle of the load execution pipeline with the determination of whether a tail hit condition exists. The tail hit condition exists when the store color of the load incremented by one is equal to the tail of the store. In other words, if the tail of the store is in the immediately following entry in the store buffer, then the tail hit condition is satisfied. In this case, there is nothing in front of the store. Also, if the load store color equals the tail of the store and the store is deallocating, then the tail hit condition is satisfied. This deallocation occurs when the tail is at a particular location in the store buffer but is in the process of moving to another position. In the preferred embodiment, a tail hit indication signal is set to a logical 0 to indicate that stores in the front; otherwise, it is a logical 1. Thus, the unconditional block requires that the load be redispatched when it is ready to be committed to permanent architectural state and all prior stores have already been committed.

In one embodiment, the memory type is determined by the PMH and the TLB during the same cycle and is validated only if the page is translated. In the present invention, the term unspeculable indicates that there are no older stores in front of it in the execution stream that have not been committed to permanent architectural state. The present invention uses a signal indicating whether the dispatch is speculative or non-speculative. An indication is given by the MOB indicating whether or not the load is at retirement. If the load is at retirement, then the first and third conditions of unconditional block detection do not exist and only the second and fourth conditions are possible.

Detection of a split access is well-known in the art. The determination of the memory type being unspeculable comes from the TLB, while by determining if the tail pointer is past the store color of the load. If so, then there are no earlier stores.

When the unconditional and array block conditions have been checked, the address validated, and tail hit calculation accomplished, the information is combined to produce one or more MOB block signals. In one embodiment, a single MOB block signal is set to a logical 1 if the unconditional block detection is true, or the array block condition is true and the tail hit equals zero, or if the unknown net indication signal is a logical 1 (true) and the load is passed directly from RS dispatch to the memory subsystem for execution without being written into the MOB. If the tail hit equals 1, then these are stores valid because the stores being checked are don't cares. Thus, using the unconditional block detection, the unknown net detection, the tail hit determination and array block detection, the present invention generates the MOB block signals. When MOB signals are asserted, the load is blocked and the data cache memory and the TLB abort the access.

Resource Dependencies

During dispatch of the load, the DTLB and data cache memory return resource blocking information. In the present invention, a load is "squashed" by the data cache memory if the load is trying to access a cache line that is already outstanding in the data cache memory (e.g., an access to a cache line that is pending). That is, the data cache memory already processing a cache miss to the same cache line as the load. In this case, the data cache memory blocks the load instead of making a duplicate bus request for the same cache line and asserts a DCSQ signal.

A load is blocked by the data cache memory when the data cache memory cannot complete the load due to resource or ordering conflicts other than a squash. For instance, a load that misses is blocked by the data cache memory when the buffers in the data cache memory (e.g., buffers 603) are full, such that a cache miss cannot be processed. Also, if there is a pending snoop occurs to the load's address inside the data cache memory.

The load may be blocked by the DTLB. This occurs when the load has page missed, and the PMH is walking the page tables for a different operation. In the preferred embodiment, the PMH only handles one page at a time. In response, the DTLB asserts a DTLB block signal. The DTLB also asserts the DTLB block signal for other conditions, such as when a load and STA simultaneously page miss, and the STA page walk has priority (i.e., the PMH handles the STA first).

Thus, for any load dispatched, the data cache memory and DTLB may assert blocking status, and the MOB may detect one or more address conflicts. If a blocking condition exists, the data cache memory aborts the cache access.

Block Code Generation and Prioritization

The MOB is responsible for prioritizing the blocking conditions and creating a block code that identifies the event that must happen before the load can redispatch. In one embodiment, blocking conditions are prioritized with the DTLB Block having the highest priority. The next highest priority is the MOB signal including the unconditional block detection and the array block.

The block information is prioritized to produce a block code. In the preferred embodiment, the block codes are NONE, store address (STA), store data (STD), data cache squash (DCSQ), data cache block (DCBLK), DTLB block (DTLBBLK) or retirement (RETR). Using the four blocking signals plus the other status produces one of the eight block codes. When a load is dispatched again, block information is generated again to produce a new status. In the present invention, a load may actually block, redispatch and block again for the same reason or a different reason. The prioritization is performed in an attempt to monotonically decrease the chance of a subsequent block.

In the present invention, the block codes are assigned after the array blocking determination. If a MOB block condition exists, the blocked load may be saved until all the earlier stores are performed. However, this has an adverse effect on the execution performance. In the currently preferred embodiment, during the second cycle, an operation is performed to further classify the block codes for loads blocked due to address dependencies. This operation is a comparison of the load to the store that had an array block. This calculation allows the present invention to determine if the accesses are to the same location, such that data could potentially be forwarded from the store that is pending. Initially, a full linear address match is performed between the address of the load and store operations. In one embodiment, only 32-bits of the two addresses are compared. If the address of the load and the store are equal and valid and the data for the store is available and the load's data size is less than the store's data size, then a store forward operation exists. In this case, the data that is to be stored may be accessed to supply the load operation. This data can be read out of the store buffer and sent back to complete the load operation. The store data is forward to the load instead of the data cache memory's data and the load is satisfied. The load is marked complete and is done.

If the full addresses are equal and valid but the data is not available for the store, the load is blocked with the STD block code. Thus, the STD block codes indicates that address and subsequent access are suitable for forwarding data to the load, but the STD microoperation of the store operation (i.e., the data calculation sub-operation of the store) has not been dispatched from the reservation station. The load is blocked until the reservation dispatches the STD for execution. Once the STD occurs, the load in the load buffer can become unblocked (i.e., it can wake up) and be forwarded to the data from the STD operation. It should be noted that the determination as to whether the data is valid is done by examining the data valid bit in the store address buffer.

If the address is not valid, then a STA block code is assigned. The STA block indicates that a block on the STA microoperation that is yet to be dispatched from the reservation station. When it does dispatch from the reservation station, the blocking condition will be removed.

If the address is overlapped but not completely, such that the load data size is greater than the store data size, then a STORE block code is assigned. This STORE block condition occurs when the store address has been translated but the data cannot be obtained from the cache memory or the store buffer because neither contains all the data that is desired. Note that hardware may be included in the computer system to receive the data from both the data cache memory and the store buffer of them and combine them. It should be noted that such hardware could be implemented into a processor. In the alternative, the load is blocked until that store is dispatched to memory. Thus, the store's execution is only dependent on the data retiring into the memory subsystem or the address being resolved. unconditional block on a non-speculative load with a tail hit.

If the data cache memory squash indication or the data cache memory block is asserted and none of the others are asserted, then the block code and the data cache memory block (DCBLK) code are generated respectively. The RETR will be generated if there is an unconditional block and there if no TLB block. A DTLB block may be generated is the TLB produces a block.

A block code of NONE is generated when a load is dispatched yet its writeback to the ROB is canceled. A block code of NONE is assigned when an unknown net is detected on the operation that is bypassed. If the writeback is canceled and the reservation station does not anticipate data for this load and will not try to schedule their operation. Normally, the load dispatched during this cycle would expect a writeback. Then, data dependent operations would be dispatched later. The reservation station of the present invention dispatches load operations such that there is only an effective one clock latency. However, if it is known that the load will not complete, then the ready scheduling is canceled. This cancellation must be early enough to prevent the ready scheduling prior to dispatch.

Each of the eight block codes is encoded with bits. An example of encoding is shown in Table 1 in order of priority.

TABLE 1

Block Codes

| CODE | TYPE | DESCRIPTION | USE ID? |
|---|---|---|---|
| 000 | NONE | The load has no block condition | No |
| 001 | STA | The load is blocked pending a STA dispatch (because a store previous to the board has an invalid store address) | Yes |
| 010 | STD | The load is blocked pending a STD dispatch (where a store previous to the load has a data conflict with the load) | Yes |
| 011 | STORE | The load is blocked pending a MOB store dispatch and deallocation | Yes |
| 100 | DCU_SQ | The load is blocked pending a data cache memory buffer (603) write | Yes |
| 101 | DCU_BLK | The load is blocked pending a data cache memory response | No |
| 110 | RETR | The load is blocked until retirement (due to its opcode memory type, or alignment) | No |
| 111 | DTLB | The load is blocked pending PMH resources | No |

When a block is determined, a block ID may also produced. The block ID allows the block codes to be qualified to prevent spurious wake-ups. For example, in the case of the store data block (STD) the store of interest has already been identified. Therefore, if any store data operations are as a wakeup, then many false wake-ups could occur. By appending the store buffer ID as the block ID, the MOB only watches for the particular STD as the flag condition. For the same reason, the STA and STORE block codes also include the SBID as a block ID. In the present invention, the STA and STORE block codes have IDs that are four bits, while the block ID for the STD is four bits. The DCSQ block code also includes a block ID. The block ID represents the chunk and the buffer (603) location corresponding to the pending load that squashed this load. In one embodiment, this field is four bits in length (2 bits each).

Load Wake-up and Scheduling

Loads in the load buffer undergo a ready/schedule/dispatch mechanism to enter the memory subsystem. In each cycle, a load is marked "ready" if the load has no outstanding block conditions (e.g., received a wakeup). Then, one of the "ready" loads is scheduled, such that older loads dispatch before younger loads. Finally, the scheduled loads dispatch and execute as described previously. Loads may be blocked due to memory order constraints or resource limitations as described previously. Blocked loads are tagged with a block code and a wake-up ID. Each load buffer entry also includes a valid bit and a complete bit. If a load entry's valid bit is set and its complete bit is not set, then the load still needs to be dispatched to the memory subsystem. The MOB uses the block code to determine when the load can dispatch.

The load buffer snoops several sets of signals to detect wake-ups. Blocked loads compare wake-up signals against their block codes and IDs and can transition from valid and blocked to valid and ready if the block code matches a wake-up code.

The present invention provides the following snoop sources: STA Dispatch which includes a store buffer ID, STA Array write which also includes a store buffer ID, STD Dispatch which includes a store data ID, STD Writeback, a data cache memory chunk and buffer wake-up which includes a chunk and a buffer ID, or the data cache memory buffer which is just the buffer ID. Also a general data cache memory squash wakeup mechanism may be included, wherein a single signal wakes up all squashed loads at a predetermined time interval to ensure that all the loads are eventually awakened. Other snoop sources include DTLB wake-up with no ID, DCBLK wake-up with no ID and RETR wake-up with no ID and STORE dispatch with the store ID buffer. Thus, there are ten snoop sources, seven having IDs.

A particular load buffer entry will wake-up according to its block code. In the case of a load having a block code of NONE, the load will always wake-up since the NONE block code is a don't care. In the case of a load with a RETR block code, the load only wakes up when the load reaches retirement. With a DTLB block code, there are various conditions that could force a DTLB block wake-up. Note that this is a normally the case since a majority of the DTLB blocks occur because the page mishandler is busy on a miss. In the case of a DCU block due to the buffers 603 being full, a single signal indicates that the buffers 603 are no longer full such that a load having a DCU block will be awakened. With respect to the DCU squash, a blocked load wakes up when a particular chunk of a particular fill buffer entry is returned to the processor. If the chunk and data cache buffer (603) designations match that of the returning data, a load having a DCSQ block code will wake up. All loads with a DCU squash block code will be awakened by the MOB after queue 603 has become empty. In one embodiment, all loads that are blocked may be awakened (unblocked) at the same time in response to a Broadcast Wakeup. This Broadcast Wakeup ensures that all loads eventually become unblocked at some point. This type of wakeup may be performed at predetermined times or at predetermined intervals of time.

FIG. 12 is a circuit schematic of one embodiment of a logic used to generate a signal indicating a particular load buffer entry is not blocked. A particular load buffer entry is not blocked when its block code is NONE or its blocked code and ID match a valid wake-up signal. Referring to FIG. 12, the block indication logic is shown having block code 1201, AND gates 1201–1208, OR gates 1209–1210 and content addressable matching (CAM) logic 1211. The bits of block code 1201 are coupled to the inputs of AND gates 1201 and 1202. Although only two AND gates are shown, in the present invention there is an AND gate for each of the block code types. The output of AND gate 1201 is coupled to one input of AND gate 1203. The other input to AND gate 1203 is the valid bit from the load buffer entry. The output of AND gate 1203 is coupled to one input of AND gate 1206. The other input to AND gate 1206 is coupled to output of CAM matching logic 1211. The inputs to CAM matching logic include the block code ID and the ID of the current wake-up source, if any. The output of AND gate 1206 is coupled to one input of OR gate 1210. The output of AND gate 1206 represents a wake-up signal for one of the block code types. OR gate 1210 receives similar wake-up signals resulting from the matches of the current wake-up source against all of the other types of block codes. For instance, in the case of AND gate 1202, each of the block code input bits is inverted and the output of AND gate 1202 represents the block code match between the block code of the wake-up signal and that of the encoding for a NONE block code. The output of AND gate 1202 is coupled to the input of OR gate 1210. It should be noted that AND gates 1201, 1203 and 1206 in conjunction with CAM match 1211 is the current configuration for matching a wake-up of the logic for matching the block code and ID of a wake-up source to the current block code of a load buffer entry. If an ID is not required for use with the block code, logic such as that shown in conjunction with AND gates 1204 and 1207 or AND gates 1205 and 1208 may be used, wherein the output of an AND gate from logic 1200 is one input to the AND gate where either the buffer or chunk and buffer signals represent the other input.

The valid bit received is input with an ID. The ID undergoes a CAM match to determine if a hit exists. The block code 1201 is decoded into the store block code output from AND gate 1201. If the valid bit is true, there is a match to the code. If the ID matches and the code matches, a wake-up is generated. This wake-up is then ORed into all the other wake-ups which also include the NONE block code signal. The output of OR gate 1210 is a signal indicating whether the particular load buffer entry is not blocked.

Thus, each of the block code IDs has six matching ports to receive six IDs and return six hits. The six matching ports indicate when the following conditions occur: the STA dispatch, the STA write, the STD dispatch, the STD writeback, the SQUASH, and the STORE. The block code is decoded into various signals which are then ANDed with the various valid bits that are received. The combination of a hit with an ID or a hit with no ID or a hit with one ID match produces a wake-up signal. Wake-up signals are all ORed together to produce a not blocked indication signal.

Each cycle a determination is made and a signal is generated indicating whether a particular load is not blocked (e.g., woken up). The not blocked signal either is asserted as a logical 1 or a logical 0 for the clock depending on the results of the matching logic. If it is determined that the load is woken-up, then a ready signal is produced and the block code is changed to NONE.

The load buffer calculates the ready signal for each load in the array during each cycle. The ready signal indicates that this load can be dispatched next cycle; however, it does not mean that the load will be dispatched during the next cycle. The ready bit is calculated based on the following logic equations (one equation for each entry):

Ready = Entry Valid AND
        NOT Compl AND (Not Blocked or Broadcast Wake-up) AND
        Load Buffer Enty Not Schedule Last Cycle where Compl indicates whether the load has complete or not.

FIG. 13 indicates the logic necessary to perform the ready bit calculation. Referring to FIG. 13, the ready bit logic includes AND gates 1301, 1303–1304, inverters 1302, 1306 and latch 1305. AND gate 1301 is coupled to receive the valid bit and the wake-up signal. The output of AND gate 1301 is coupled to one input of AND gate 1303. The other input to 1303 is coupled to the output of inverter 1302. The input to inverter 1302 is the COMPL signal. The output of AND gate 1303 is coupled to one input of AND gate 1304. The other input to AND gate 1304 is the output of inverter 1306. The input to inverter 1306 is the output from latch 1305. The input to latch 1305 is the feedback ready output from AND gate 1304. The wake-up signal is ANDed with the valid bit, such that if each is a logical 1, the output of AND gate 1301 is a logical 1. If the output of AND gate 1301 is a logical 1 and the load is not completed such that the input to AND gate 1303 is a logical 1, then the output of AND gate 1303 is a logical 1. If the load operation has not been scheduled during the last cycle, the other input to AND gate 1304 will be a logical 1 and the ready bit will be asserted high.

This indicates that the specific load is woken up. The ready signal is fedback to ensure that the load is not scheduled during the next cycle. Furthermore, the ready signal clears the block code. In one embodiment, the block code is cleared by setting it to NONE, such that it will always generate a ready signal in all of the subsequent cycles.

The ready bits are used to schedule one of the ready loads. The oldest ready load is scheduled with the tail pointer in the load buffer determining which load is the oldest. The tail pointer in the load buffer keeps track of the oldest load operations in the same way as the tail pointer in the store address buffer. In one embodiment, the result from the schedule is a 16-bit vector, where at most one bit is set. If the bit is set, it is guaranteed to point to the oldest load that was marked ready. This schedule of vectors is used during ready bit calculation for the next cycle to prevent the same load from being scheduled in consecutive cycles.

The scheduler as shown in FIG. 14 computes the schedule vector in a manner similar to a circular carry chain according to the following formula (if i=0, then i−1 is 15):

$$\text{Sched}_i = (\text{Ready}_i \text{ AND NOT Carry}_{i-1}) \text{ OR } (\text{Ready}_i \text{ AND Tail}_i \text{ AND Carry}_{i-1}).$$

$$\text{Carry}_i = (\text{Tail}_i \text{ AND Ready}_i) \text{ OR } (\text{NOT Tail}_i \text{ AND Ready}_i) \text{ OR } (\text{NOT Tail}_i \text{ AND Carry}_{i-1}).$$

The carry bits turn on at the first ready bit, and stays on until the chain wraps around. The carry bit enables the schedule bit, i.e. the schedule bit for a ready load is set if the Carry In is not set; otherwise, it is zero since an earlier load has been scheduled. In one embodiment, a two level propagate/generate carry chain is used.

Each load buffer entry sends its tail flag to the scheduler. The tail flag indicates the oldest entry in the load buffer. In the present invention, one particular entry knows that it is the oldest and provides that information to the scheduler. (The scheduler ideally desires to choose the oldest load that is ready.)

The scheduler performs prioritization and produces a single bit indicating which of the woken-up loads is to be dispatched. Each entry is looking for that entry bit. If a load buffer entry receives the schedule bit, then it reads out of the array to the bus where it is potentially dispatched. It should be noted that it doesn't actually ensure that the load will be dispatched because there may be a higher priority memory operation that requires dispatching. Therefore, the load operation is read out of the array and if it is the first choice for dispatch by the MOB. If it does dispatch, then the entry is cleared. Once a load is dispatched from the load buffer, it is forgotten until it writes back. The writeback will occur with new status. It should be noted that it may be blocked again for other reasons.

The present invention may schedule the loads in numerous ways. For example, the scheduler could choose to schedule loads randomly. However, this does not ensure that the oldest stores will be chosen. In another embodiment, the scheduler can choose from the top of the load buffer to the bottom or vice versa. However, the choice of loads for execution would be biased based on the physical structure. FIG. 15 summarizes the wake-up, schedule and dispatch process.

Load Squashing

A load operation is squashed (e.g., blocked) by the data cache memory if the load is trying to access a cache line that is al,ready outstanding in the data cache memory. As the data cache memory receives a stream of load operations, the data cache memory determines through well-known tag matching techniques whether the data is currently stored in the data cache memory. If the data is in the data cache memory, then the data is provided to complete the load operation. If the data is not in the data cache memory, then a cache miss results and a bus cycle is generated to obtain the data from an external source, such as a level two (L2) or higher order cache memory or the external main memory residing on the system bus.

The data cache memory of the present invention is a non-blocking cache, such that the data cache memory is capable of allowing data requests that are missed to continue onto external sources while accommodating subsequent requests for data. The data cache memory receives a stream of data requests. Such a sequence is shown in FIG. 16. Referring to FIG. 16, an execution sequence of load operations is shown. The first load (Id #1) operation is dispatched to the memory system and is received by the data cache memory. If the access to the data cache memory produces a miss, then the data cache memory generates a bus cycle and sends the request for a cache line to an external memory to satisfy the request. For instance, the request may be forwarded to a L2 cache memory. Thus, the result of the data cache memory miss is a request for a cache line. In the preferred embodiment, the cache line includes 32 bytes. Therefore, in response to a cache miss, a request for 32 bytes is sent eternally. The second (Id #2), third (Id #3) and fourth (Id #4) loads are also dispatched to the data cache memory during later cycles. If the data requested by any of these subsequent load operations is to the same cache line requested by the first load (Id #1), then the present invention squashes those load operations, thereby preventing them from being sent to external memory. In other words, if any other operations are going to hit the 32-byte quantity requested as a result of the data cache memory miss, then the present invention does not send another request out to the external system to satisfy the data requests of these operations. For instance, if the second load (Id #2) requests data that is contained in the 32 byte quantity, then the second load (Id #2) would be squashed. However, if the data requested by the third load (Id #3) is not contained in the 32 byte quantity requested by the first load (Id #1), then this load operation is allowed to hit or miss the cache, and if required, be sent to an external memory, in a manner well-known in the art. Note that if only a portion of the requested data for a subsequent load is being returned in a pending request, then the load is blocked, and not squashed.

In the present invention, each load that is requesting data contained in a currently pending bus cycle is squashed. Numerous load operations may be squashed waiting for one particular pending load operation to complete. The data cache memory of the present invention is capable of having multiple load operations to external memory pending at the same time. In this case, if a load operation requests data that may be contained in the data of any of these pending load operations, then the load operation is squashed.

The present invention uses a queue 603 located in the data cache memory to manage the pending cache misses. A queue 603 entry is allocated when a cache miss occurs and tracks the miss as it is sent and returned from an external memory. When a load operation is dispatched to the data cache memory, a tag match is performed in a manner well-known to those skilled in the art and the queue 603 is examined to determine if either structure contains the required data or has a request for the data pending. If the data is found in the data cache memory, then there is a hit and the data is returned immediately. If a data cache miss occurs, the results of whether the data is contained in the queue 603 or whether there is already a request pending are evaluated. If there is a hit to the queue 603, then the data is returned in the same manner as if it had been returned from the data cache memory itself. Note that in one embodiment, the data cache memory and the queue 603 are checked simultaneously. If there is a hit in the queue 603 and the data is not present (i.e. the request is still pending), then the present invention squashes that load operation. The load operation is squashed until after the request is no longer pending.

A pipelined implementation of a load operation is shown in FIG. 17A. Referring to FIG. 17A, the load is dispatched by the reservation station during the first cycle. The load is dispatched to both the MOB and the data cache memory. The MOB retains a copy of the load operation. In the next cycle, the linear address is generated. In the preferred embodiment, the linear address is generated by the AGU. During the second cycle, the load operation is dispatched to the memory system for execution. During the first part of the third cycle, the data cache memory performs a lookup with the tag to determine if the requested data is currently stored in the cache, while the DTLB translates the linear address to a physical address. In the second half of the cycle, the physical address is sent to the data cache memory to complete the tag matching operation. The result of the tag matching operation produces a hit if the address of the load operation matches the address of data already in the data cache memory or a request for such data is pending or a miss if the data is not in the cache memory and there is no pending request for the data stored in the cache memory at this time. The tag match is performed in the normal data cache array structure and the queue 603. If there is a hit in the queue 603, then the data is not resident in the data cache array; it is either resident in the queue 603 or is being returned as part of a pending request. If the data is part of a pending request currently being stored in the queue 603, then data cache memory signals a squash condition for the load to the MOB during the later half of the third cycle. In the following cycle, the MOB writes a load buffer array with a squash status.

In the preferred embodiment, a block code and block ID are written into the load buffer in response to a squash signal from the data cache memory if there are no higher priority block conditions (after the MOB prioritizes the blocking conditions). The block code and block ID are written in the fourth clock cycle, as shown in FIG. 17A. The block code is the code corresponding to the block code "squash". The ID has two fields. The first field indicates the location in the queue 603 having the pending memory operation for the data for which the squashed load operation is waiting. In the present invention, the queue 603 has four entries. In this case, the first field includes two bits to indicate which of the four queue 603 locations corresponds to the data being requested. The second field indicates which portion of the data being returned is significant (i.e., which portion of the data includes the requested data requested by the squashed load operation). In the preferred embodiment, the data being returned includes 32 bytes. In the preferred embodiment, the second field includes two bits to indicate which of the 8 byte quantities (chunks) has the desired data. Thus, in the preferred embodiment, a 4-bit ID is used to identify the very specific location in the queue 603 that is going to provide the data to satisfy the data request of the squashed load.

FIG. 17B illustrates the data flow of the load operations. The load operations are dispatched and received by the MOB. The MOB sends the loads to the data cache memory and the queue 603. If the data cache memory hits, then the hit data is returned. If the data cache memory misses, but the queue 603 hits, then the hit data is returned. If the data cache memory misses, but the queue 603 hits, then the data is returned if the data is already contained in the queue 603, or a squash signal is sent to the MOB, thereby aborting the load where a data request for the data is pending. If the data cache and the queue 603 miss, then the operation is stored in the queue 603 which produces a bus cycle to the bus controller request the data.

It should be noted that when a load operation misses both the data cache memory and the queue 603, a location in the queue 603 is allocated, the load operation itself is kept in the queue 603, external load request is generated, and the queue 603 is set up for subsequent squashes using partial address and status.

Figure 18:
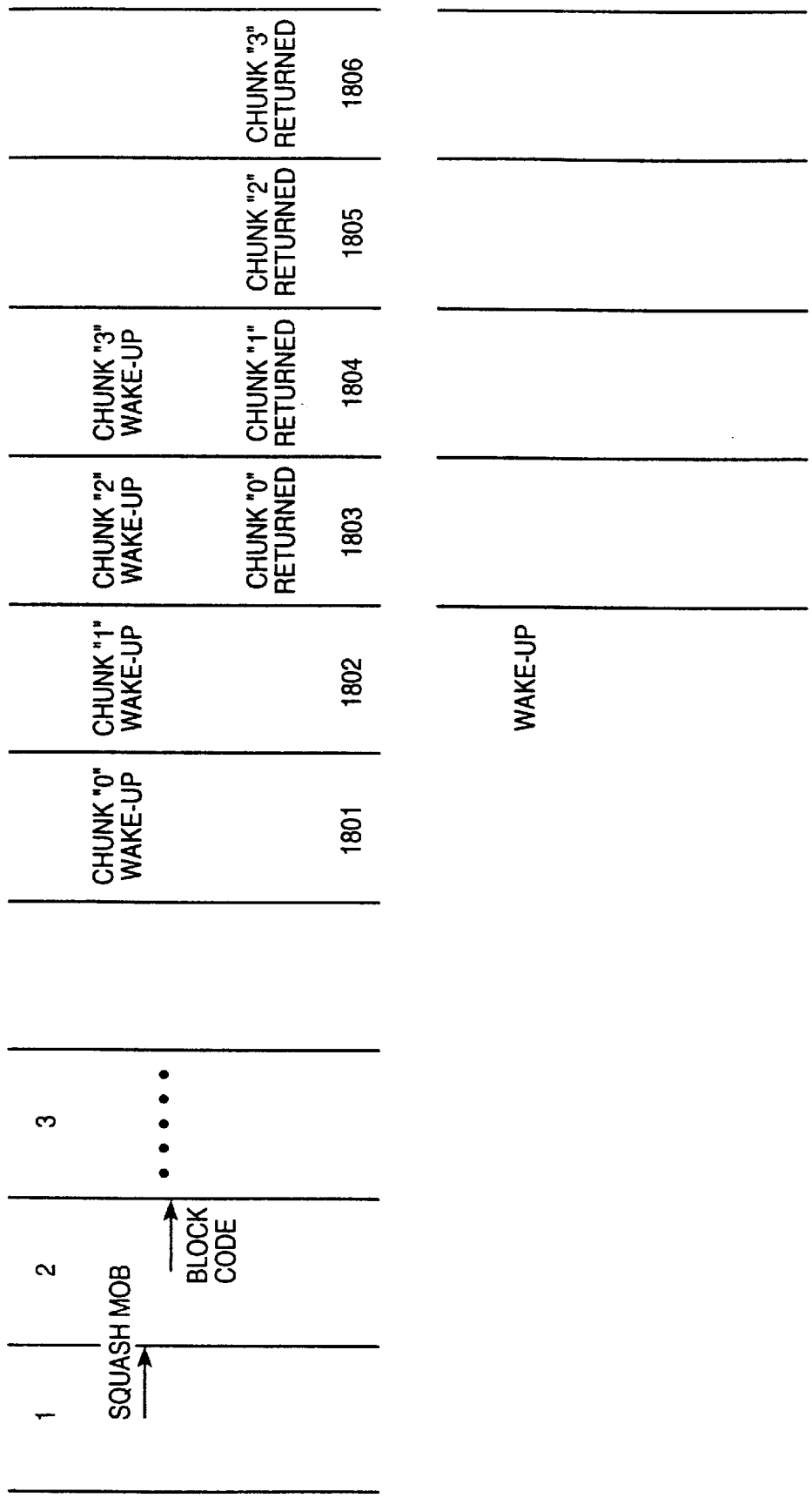
FIG. 18A is a diagram of the pipe stages for unblocking a load operation.
FIG. 18B is a diagram of the pipe stages depicting the return of data.

FIG. 18A is a diagram of the pipe stages for the wake-up of a squashed load operation (or any wakeup). Referring to FIG. 18A, once the data comes back and the load buffer is signaled to wake-up. That is, as the data is being written into the queue 603 entry, a wake-up indication signal is asserted. The wake-up signal includes the queue 603 ID and the chunk identification as well as the block code. In the same cycle, the block code is matched. If the queue 603 ID and the chunk identification match an entry in the load buffer, the load operation wakes up.

Note that multiple load operations stored in the load buffer may wake up on the same chunk. For instance, if eight separate accesses are made for data in the same chunk, the eight load operations are waiting for the data to return and all may wake up simultaneously. If a match occurs, in the next clock cycle, ready scheduling occurs of all of the load operations that have awakened. Scheduling logic takes the oldest operation in terms of its location in the buffer (e.g., the oldest load operation in the instruction buffer) and dispatches it to obtain the data in the next clock cycle. At that point, the squashed load operation becomes a normal load, with the exception that it is satisfied out of the queue 603 itself. Once it is satisfied from the queue 603, then it is a normal load.

In the present invention, because the cache lines are larger that the databus size, the data is divided into multiple parts and the parts are returned in successive cycles. In the preferred embodiment, when the data returns from the external system (L2 or system memory, etc.), the data is returned in 8 byte portions, or chunks, on a datapath that is 64 bits wide. Each of the chunks are identified by a predetermined number of bits, such as two. In the preferred embodiment, the successive chunks are identified as chunks 0, 1, 2 and 3. Each separate chunk is written into a storage location in the queue 603 according to its chunk identification.

In the present invention, the cache line is accessed in the order the chunks of data return. The data may return in order from chunk 0 to chunk 3. However, the data may return out-of-order and may include having the chunk containing the specific data requested by the pending operation being written first, referred to herein as the critical chunk. In one embodiment, the data is returned in a pipelined fashion. In the preferred embodiment, due to the data being returned in four separate portions, the data is returned in four separate and successive cycles.

When the data is returned in successive cycles, the present invention anticipates the data that is returning. The wake-up indication signal is sent, such that the wake-up of a load coincides with the return of the data. FIG. 18B illustrate the pipeline stages for the chunk data being returned. Referring to FIG. 18B, the chunks are returned in order 0–3. After some number of cycles following a squash, the chunk ID specifying chunk 0 is sent in clock cycle 1801. In clock cycle 1802, while the chunk ID for chunk 1 is sent, load operations requesting data in chunk 0 are awakened. In clock cycle 1803, the data for chunk 0 becomes available, while a load operation becomes ready and is scheduled, such that at the end of clock cycle 1803 the scheduled load operation is dispatched to obtain the data. In this manner, the return of the data is anticipated. The same timing between the redispatched squashed loads and returned chunks 1–3 occurs in the same way.

In the present invention, the external bus indicates to the data cache memory that data is returning. In response, the data cache memory notifies the load buffer of the impending return of data. By preparing to receive the data ahead of time, the present invention effectively reduces any latency between the return of the data and its use in satisfying the request of the load.

The protocol of the data return is such that the queue 603 receives an indication that the data is returning and signals the MOB to that effect. The MOB replies by providing an indication that the data is desired for a load operation and the MOB issues the load. The load is dispatched and received by the data cache memory as if it were a regular load, such that the data is written into the queue 603 when the data cache memory receives the load operation. This time, however, the load will hit the queue 603, and the data will be forwarded to satisfy the load.

It should be noted that when all four chunks have been written into the queue 603, a line in the cache may be replaced with the data in the queue 603. In one embodiment, this replace cycle occurs at an idle time.

This pipelining and unblocking of loads is an interaction between the data cache memory and the external memory system in terms of the anticipation of data coming back. This is a unique performance enhancement to decrease the latency to memory. Load squashing at a miss is also an external memory optimization where data traffic is reduced to the external bus by only issuing one request and blocking the rest them. Furthermore, the loads may be awakened based on bits depicting a specific chunk. By doing this, the data returns may be pipelined as the present invention anticipates the data being returned.

By performing load squashing, the present invention provides a non-blocking cache. In the prior art, if there is a miss to the cache memory, then all subsequent accesses to the cache would be prevented until the data corresponding to the miss is returned to the cache, thereby blocking all of the subsequent memory operations in the mean time. Effectively, the present invention performs request compression by reducing repetitive requests for data. The present invention permits cache misses to be sent to external memory, while the cache handles subsequent accesses, even accesses to the same cache line. The present invention, in fact, is allowed to allow to have multiple memory operations pending on the external bus at one time, while still servicing other memory operations.

In the case of accesses to the same cache line, the present invention block those later dispatched load operations until the data from the preceding request is returned. In other words, the first access is permitted to execute to external memory, while the others are blocked. By doing so, bandwidth is preserved, thereby increasing performance. In a multiprocessor environment where the external bus is a limited resource, other computers or microprocessors on that system bus can preserve that resource by not using it for repetitive accesses.

By pipelining the data return, the present invention reduces the number of clock cycles required to fulfill the request by two over the prior art.

Moreover, when using the wake-up mechanism of the present invention, the latency can be reduced by three clock cycles over the prior art memory systems.

Timing Diagrams

FIG. 19 is a timing diagram depicting the dispatch, block, and wake-up timing for a load operation. Referring to FIG. 19, the load operation 1901 is dispatched into the memory subsystem during the first clock signal. Also during the first clock cycle, other dispatch signals 1902 are asserted (or unasserted) to facilitate the dispatching of the load operation. After conflict and condition checks have been completed, a single block signal 1903 is asserted at the end of the second cycle. Some clock cycles later after the condition or conflict has removed, a wake-up signal is asserted in the middle or a clock cycle. Note that in FIG. 19, no IDs are involved.

FIG. 20 is a timing diagram depicting the dispatch, squash, block and wake-up timing and signals for a load operation. Referring to FIG. 20, the type of squash is due to a load access which hits an entry in the queue 603 that has already been allocated for the same cache line but the required data has not yet returned from the bus controller. The load operation 2001 is dispatched during the first clock cycle, along with other dispatch signals 2002 being asserted/deasserted. At the end of the second cycle, the squash signal 2003 is asserted. At the same time, the squash ID 2004, indicating the queue 603 entry and desired chunk is sent. Some clock cycles later, the chunk wake-up signal 2005 is asserted. Note that the chunk wake-up signal 2005 is asserted for four cycles. The chunk ID 2006 for each of the four cycles is different. It should be noted that this kind of wake-up occurs when each chunk of data returns from the bus controller, or when a data return is schedule three cycles before the return of the data. A buffer wake-up signal has been omitted from FIG. 20 and is asserted when the read complete for the buffer returns from the bus controller.

FIG. 21 is a timing diagram illustrating the load wake-up and speculative dispatch according to the present invention. The load buffer in the MOB receives a wake-up signal and re-dispatches an operation speculatively. In this case, the data cache memory has sent a DCU squash wake-up signal with the ID of the queue 603 that blocked the load. Referring to FIG. 21, the data cache memory sends a buffer wake-up signal 2101 and a wake-up ID 2102 to the load buffer. The ID 2102 is latched at the end of the clock. During the second clock cycle, the load buffer performs an internal content addressable (CAM) match on the wake-up, thereby setting the ready bits for those entries blocked on the queue 603. These bits are sent to the scheduling carry chain to determine one entry to speculatively dispatch the next cycle. During the third clock cycle, the scheduled entry 2104 is read into the load buffer, it is latched, it arbitrates for the bus, and is driven by the MOB onto the bus with the address, opcode and the data in conjunction with a valid signal 2103. During the fourth cycle, the load executes normally, continuing into the fifth clock cycle. At the end of the fifth clock cycle, the data cache memory is returning the data 2106 to the reservation station and the ROB, strobed by the valid signal 2105.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

We claim:

1. A processor for use in a computer system, said processor comprising:
   an issue unit to dispatch a load operation for execution;
   a memory execution unit, coupled to the issue unit, to execute memory operations, wherein the memory execution unit comprises
      means for determining whether non-data dependencies exist on the load operation,
      means for blocking load operations to prevent load operations including the load operation from executing in response to the means for determining identifying non-data dependencies existing with respect to the load operations, and
      a buffer to store load operations being blocked including the load operation, said buffer storing indications of non-data dependencies causing the load operations to be blocked, each of the indications is associated with an individual blocked load operation and identifying an event that is to occur prior to executing its associated blocked load operation;
   on means for blocking to unblock load operations stored in the buffer for execution when the non-data dependencies no longer exist.

2. The processor defined in claim 1 wherein the memory execution unit includes a dispatcher to dispatch the load operation from the buffer to memory when said at least one non-data dependency no longer exists.

3. The processor defined in claim 1 wherein the means for determining includes first means for determining whether a resource dependency exits.

4. The processor defined in claim 3 wherein the means for determining includes means for determining whether a cache memory in the processor is able to handle an access by the load operation.

5. The processor defined in claim 4 wherein the means for determining whether a cache memory in the processor is able to handle an access by the load operation determines the cache memory cannot handle the access by the load operation due to a miss to the cache memory and the load operation cannot be dispatched to external memory.

6. The processor defined in claim 3 wherein the means for determining includes means for determining whether a page miss handler in the processor is able to handle an access by the load operation, wherein the load operation is blocked if the page miss handler cannot handle the access by the load operation.

7. The processor defined in claim 3 wherein the means for determining includes means for determining whether a translation lookaside buffer in the processor is able to handle an access by the load operation, wherein the load operation is blocked if the translation lookaside buffer cannot handle the access by the load operation.

8. The processor defined in claim 1 wherein the means for determining includes a first means for determining whether an address dependency exists between the load operation and another instruction.

9. The processor defined in claim 8 wherein the first means for determining includes means for determining whether the address of the load operation conflicts with an address for a pending store instruction issued prior to the load operation.

10. The processor defined in claim 8 wherein the first means for determining includes a second means for determining if an invalid address exists for a pending store operation.

11. The processor defined in claim 8 wherein the first means for determining includes a second means for determining if the address of the load operation is the same as an address of a pending store operation.

12. The processor defined in claim 8 wherein the first means for determining includes a second means for determining if a pending store operation blocks all load operations.

13. The processor defined in claim 8 wherein the first means for determining includes a second means for determining if the load operation overlaps a pending store operation.

14. The processor defined in claim 8 wherein the first means for determining includes a second means for determining if the load operation has a memory type of unspeculable.

15. The processor defined in claim 8 wherein the first means for determining includes a second means for determining if the load operation has a memory type of unspeculative, and third means for determining if at least one pending store operation precedes the load operation.

16. A processor for use in a computer system, said processor comprising:
    an issue unit to dispatch memory operations including a load operation; and
    a memory execution unit coupled to the issue unit to execute the load operation; wherein the memory execution unit comprises
       means for indicating whether resource and address dependencies exist on a plurality of load operations including the load operation,
       means for blocking execution of the load operation,
       a buffer having a plurality of entries to store the load instruction and dependency identification information in response to the indicating means determining the existence of at least one address or resource dependency on the load instruction, such that the load operation is prevented from executing where dependency identification information identifies an event that is to occur prior to its execution, and
       a dispatcher to send the load operation from the buffer to memory when said at least one address or resource dependency no longer exists.

17. A method for executing load operations comprising the steps of:
    dispatching a load operation to an execution unit in a processor for execution;
    determining whether any address or resource dependency exists, wherein the step of determining comprises detecting pending store operations having uncalculated addresses;
    aborting the load operation when at least one address or resource dependency exists, wherein the step of aborting includes aborting the load operation when a pending store operation having an uncalculated address is detected;
    storing the load operation in a first buffer in the processor as one of a plurality of blocked load operations along with a code indicating the type of said the at least one address or resource dependency and an index into storage for storing another pending operation if completion of the pending operation comprises an event causing the load operation to be blocked; and redispatching the load operation from the first buffer after said at least one address or resource dependency no longer exists in order to execute the load operation to memory.

18. The method defined in claim 17 wherein the step of dispatching comprises the steps of dispatching the load operation from a reservation station.

19. The method defined in claim 17 wherein the step of determining whether any address or resource dependency exists further comprises the steps of identifying store operations that have not been dispatched to memory; and identifying whether a store operation having an invalid address is contained in the pending store operations; and further wherein the step of aborting the load operation comprises aborting the load operation in response to identifying the store operation having the invalid address.

20. The method defined in claim 17 wherein the step of dispatching includes assigning an identification (ID) corresponding a store operation dispatched for execution prior to and nearest in time to the load operation.

21. The method defined in claim 20 wherein the ID identifies a location in a second buffer storing a plurality of store operations.

22. The method defined in claim 21 wherein the step of detecting includes the steps of searching the second buffer for pending store operations having unknown addresses stored in the second buffer between the oldest store operation and the location in the second buffer corresponding to the ID assigned the load operation, and further comprising the step of blocking the load operation if at least one of the addresses for the store operations buffered between the ID and the oldest store operation in the buffer has an unknown address.

23. The method defined in claim 22 wherein the step of detecting includes detecting at least one valid bit in each entry in the second buffer from the ID of the load operation to the oldest store operation in the second buffer, wherein if said at least one valid bit is in a first logic state then the address is valid, while if said at least one valid bit is in a second logic state, then the address is not valid.

24. The method defined in claim 17 wherein the information indicating said at least one address or resource dependency comprises an ID indicating a store operation and a code indicating a type of dependency.

25. A method comprising the steps of:

dispatching a load operation for execution to an execution unit in a processor;

detecting at least one address or resource dependency;

aborting the load operation;

prioritizing blocking conditions for the load operation;

generating a block code identifying an event required to occur before redispatching the load operation to memory;

storing the load operation and block code in a buffer as one of a plurality of block load operations; and redispatching the load operation to memory after the event occurs.

26. The method defined in claim 25 wherein the step of detecting at least one address or resource dependency comprises detecting an address match between an untranslated address of the load operation and at least one pending store operation and the step of generating a block code generates a block code indicating said at least one pending store operation.

27. The method defined in claim 25 further comprising the step of dequalifying at least one store operation from blocking the load operation.

28. The method defined in claim 27 further comprising the step of setting at least one bit in a buffer to dequalify said at least one store operation.

29. The method defined in claim 25 further comprising the step of determining if a previously pending store operation blocks all loads, and wherein the step of aborting the load operation aborts execution of the load operation in response to the identifying the previously pending store operation.

30. The method defined in claim 29 wherein said previously pending store operation comprises a fence operation.

31. The method defined in claim 25 further comprising the step of prioritizing the prior store conditions.

32. The method defined in claim 31 wherein the step of prioritizing comprises prioritizing the prior store conditions from an ID corresponding to the load operation to the oldest pending, non-dispatched store operation.

33. The method defined in claim 32 wherein the oldest pending, non-dispatched store is ascertained according to an ID assigned when the store operation was dispatched.

34. A method of executing load operations comprising the steps of:

dispatching a load operation to a processor execution unit;

aborting the load operation when a non-data dependency exists, wherein the step of aborting comprises the steps of detecting any resource and address conflicts for the load operation, halting execution of the load operation in response to detecting at least one resource or address conflict, storing the load operation in a buffer along with a plurality of blocked load operations, generating a block code indicative of said at least one resource or address conflict, and storing the block code; and redispatching the load operation after the dependency no longer exists, such that the load operation completes execution.

35. The method defined in claim 34 further comprising the step of prioritizing said at least one resource or address conflict into the single block code.

36. The method defined in claim 35 wherein the block code comprises an ID, wherein the load operation is redispatched according to when the ID is received.

37. The method defined in claim 36 wherein the ID identifies a store operation responsible for the load operation being blocked.

38. The method defined in claims 35 wherein the ID identifies data indicative of when to redispatch the load operation.

39. A method for performing a load operation in a computer system, said method comprising the steps of:

dispatching the load operation for execution;

halting the execution of the load operation due to a dependency;

generating a code to identify the dependency;

storing the load operation and the code in a buffer;

monitoring the dependency to determine when the dependency no longer exists, wherein the step of monitoring comprises matching the code with wakeup sources; and redispatching the load operation from the buffer after the dependency no longer exists, wherein the load operation completes execution.

40. A processor comprising:

an issue unit;

a memory execution unit operable to perform load operations, said memory execution unit comprising block prioritization logic responsive to address and resource blocking conditions and identification signals to block load operations;

a load buffer coupled to the block prioritization logic to store a plurality of load operations with individual codes indicative of blocking conditions, wherein the block prioritization logic unblocks a plurality of blocked load operations at the same time when address and resource blocking conditions causing the plurality of blocked load operations no longer prevent their execution.

41. The processor defined in claim 40 wherein the block prioritization logic prioritizes blocking conditions.

42. The processor defined in claim 40 further comprising a data cache and a translation lookaside buffer coupled to indicate resource conflicts with load operations to the block prioritization logic.

43. The processor defined in claim 40 further comprising a first signal coupled to the block prioritization logic to indicate when an invalid address is contained in a store buffer entry containing pending store operations, said block prioritization logic blocking a load operation in response to such an indication.

44. The processor defined in claim 40 further comprising a first signal coupled to the block prioritization logic to indicate when a portion of an address of a store operation matches the corresponding portion of an address of the load operation, said block prioritization logic blocking the load operation in response to such an indication.

45. The processor defined in claim 40 further comprising a first signal coupled to the block prioritization logic to indicate when a store operation blocks all load operations, said block prioritization logic blocking load operations in response to such an indication.

* * * * *

UNITED STATES PATENT AND TRADEMARK OFFICE
CERTIFICATE OF CORRECTION

| | | |
|---|---|---|
| PATENT NO. | : 5,881,262 | Page 1 of 1 |
| DATED | : March 9, 1999 | |
| INVENTOR(S) | : Abramson et al. | |

It is certified that error appears in the above-identified patent and that said Letters Patent is hereby corrected as shown below:

<u>Column 23,</u>
Line 66, delete "al,ready" and insert -- already --.

Signed and Sealed this

Second Day of December, 2003

JAMES E. ROGAN
*Director of the United States Patent and Trademark Office*